(12) United States Patent
Su

(10) Patent No.: US 10,542,265 B2
(45) Date of Patent: Jan. 21, 2020

(54) SELF-ADAPTIVE PREDICTION METHOD FOR MULTI-LAYER CODEC

(71) Applicant: DOLBY LABORATORIES LICENSING CORPORATION, San Francisco, CA (US)

(72) Inventor: Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 154 days.

(21) Appl. No.: 15/329,550

(22) PCT Filed: Sep. 8, 2015

(86) PCT No.: PCT/US2015/048838
§ 371 (c)(1),
(2) Date: Jan. 26, 2017

(87) PCT Pub. No.: WO2016/040255
PCT Pub. Date: Mar. 17, 2016

(65) Prior Publication Data
US 2017/0214924 A1    Jul. 27, 2017

Related U.S. Application Data

(60) Provisional application No. 62/048,063, filed on Sep. 9, 2014.

(51) Int. Cl.
*H04N 19/187* (2014.01)
*H04N 19/30* (2014.01)
(Continued)

(52) U.S. Cl.
CPC ......... *H04N 19/187* (2014.11); *H04N 19/192* (2014.11); *H04N 19/30* (2014.11);
(Continued)

(58) Field of Classification Search
CPC ....... H04N 19/187; H04N 19/30; H04N 19/44
See application file for complete search history.

(56) References Cited

U.S. PATENT DOCUMENTS

| 5,151,949 A | 9/1992 | Miyata |
|---|---|---|
| 8,811,490 B2 | 8/2014 | Su |

(Continued)

FOREIGN PATENT DOCUMENTS

| EP | 2320653 | 5/2011 |
|---|---|---|
| WO | 2009/087952 | 7/2009 |
| WO | 2010/003692 | 1/2010 |

*Primary Examiner* — Robert J Hance

(57) ABSTRACT

Relatively low dynamic range images or image partitions are converted into relatively high dynamic range images or image partitions that comprise reconstructed pixel values having a higher dynamic range than pixel values of the relatively low dynamic range images. Information relating to reconstructed pixel values of the relatively high dynamic range images and pixel values of the relatively low dynamic range images is collected. Prediction parameters are derived from the collected information. A predicted image or image partition is predicted from a relatively low dynamic range image or image partition based on the prediction parameters and comprises predicted pixel values having the higher dynamic range than pixel values of the relatively low dynamic range image or image partition.

28 Claims, 14 Drawing Sheets

(51) Int. Cl.
*H04N 19/44* (2014.01)
*H04N 19/463* (2014.01)
*H04N 19/192* (2014.01)
*H04N 19/593* (2014.01)

(52) U.S. Cl.
CPC .......... *H04N 19/44* (2014.11); *H04N 19/463* (2014.11); *H04N 19/593* (2014.11)

(56) References Cited

U.S. PATENT DOCUMENTS

| | | | |
|---|---|---|---|
| 8,872,981 B1* | 10/2014 | Gish | H04N 19/46 |
| | | | 345/590 |
| 9,264,681 B2 | 2/2016 | Gish | |
| 9,374,576 B2 | 6/2016 | Su | |
| 9,549,194 B2* | 1/2017 | Ye | H04N 19/36 |
| 2010/0046612 A1* | 2/2010 | Sun | H04N 19/149 |
| | | | 375/240.02 |
| 2011/0090959 A1* | 4/2011 | Wiegand | H04N 19/593 |
| | | | 375/240.12 |
| 2011/0188571 A1 | 8/2011 | Maani | |
| 2012/0236929 A1 | 9/2012 | Liu | |
| 2013/0177066 A1* | 7/2013 | Ye | H04N 19/36 |
| | | | 375/240.02 |
| 2013/0243085 A1 | 9/2013 | Kovliga | |
| 2014/0348232 A1* | 11/2014 | Leontaris | H04N 19/597 |
| | | | 375/240.12 |
| 2014/0376624 A1* | 12/2014 | Li | H04N 19/159 |
| | | | 375/240.12 |
| 2015/0049956 A1* | 2/2015 | Kato | H04N 19/50 |
| | | | 382/233 |

* cited by examiner

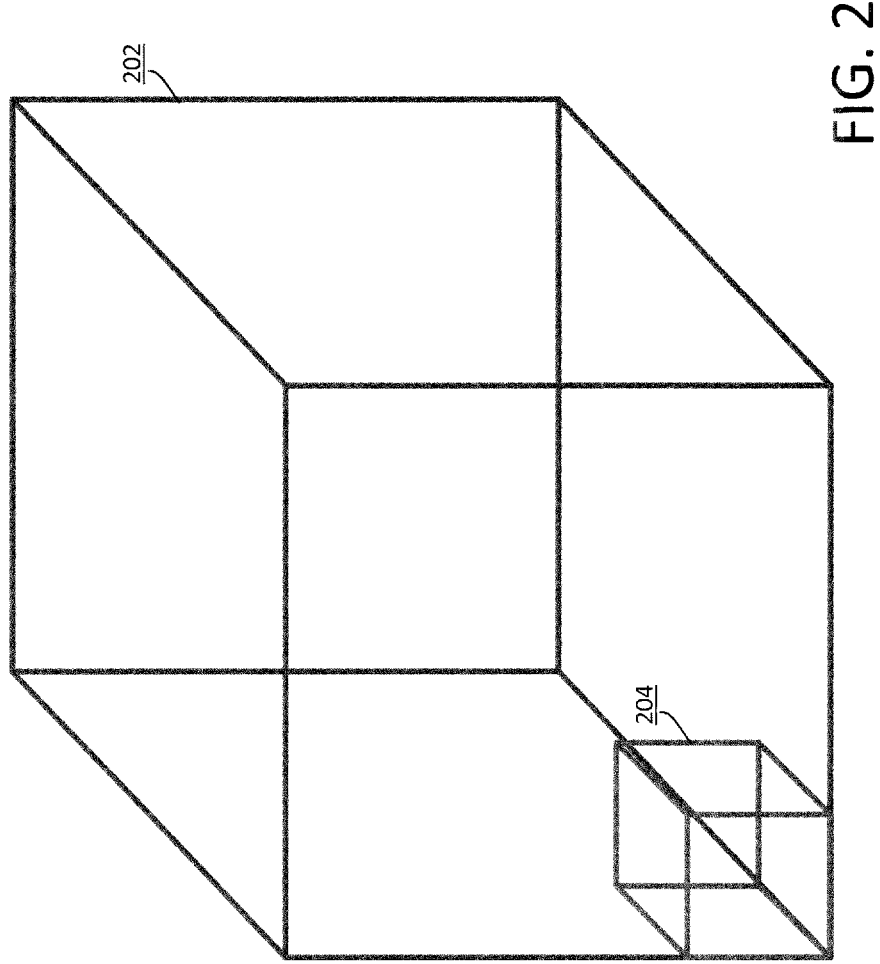

generate, based on relatively low dynamic range Images and relatively high dynamic range residual Images, relatively high dynamic range images 502 collect Information relating to reconstructed pixel values of the relatively high dynamic range images and pixel values of the relatively low dynamic range images 504 derive, from the collected information, prediction parameters 506 generate a predicted image from the relatively low dynamic range image based on the prediction parameters derived from the collected information 508

FIG. 5A generate, based on relatively low dynamic range image partitions and relatively high dynamic range image partitions, relatively high dynamic range image partitions 522 collect Information relating to reconstructed pixel values of the relatively high dynamic range image partitions and pixel values of the relatively low dynamic range image partitions 524 derive, from the collected information, prediction parameters 526 generate a predicted image partition from the relatively low dynamic range image partition based on the prediction parameters derived from the collected information 528

FIG. 5B

SELF-ADAPTIVE PREDICTION METHOD FOR MULTI-LAYER CODEC

CROSS-REFERENCE TO RELATED APPLICATION

This application claims priority to U.S. provisional patent application No. 62/048,063 filed Sep. 9, 2014 and entitled "Self-Adaptive Prediction Method For Multi-Layer Codec" which is hereby incorporated by reference in its entirety.

TECHNOLOGY

The present invention relates generally to image processing, and in particular, to encoding, decoding, and representing video images.

BACKGROUND

The terms "VDR" or "visual dynamic range" and "EDR" or "enhanced dynamic range" as used herein may refer to a dynamic range (e.g., 10,000 nits, 12,000+ nits, etc.) wider than a relatively low dynamic range such as a standard dynamic range (SDR), an intermediate high dynamic range (e.g., 1000 nits, 2000 nits, etc.), etc., and may include, but is not limited to, a wide dynamic range up to the instantaneously perceivable dynamic range and color gamut which human vision can perceive at an instant.

Multiple layers may be used to deliver video data from an upstream device such as a multi-layer video encoder to downstream devices. For example, visual dynamic range (VDR) video data can be carried in the combination of a base layer and an enhancement layer (EL) of the multiple layers for viewing experience of VDR displays. BL image data may be encoded with low or partial dynamic range (e.g., SDR, an intermediate high dynamic range, etc.) image data derived from VDR images. EL image data may be encoded with residual image data which, along with image data inversely mapped from the BL image data enables a downstream recipient system to reconstruct a version of the VDR images.

The parameters to be used for inverse mapping by a downstream recipient system can take a significant portion (e.g., 20%, 30%, 50% or more, etc.) of an overall bit rate used to stream a corresponding media program. In some instances, transmission of these parameters may need a bit rate around 50 kbps~100 kbps, no matter what image resolutions with which the media program is being streamed or transmitted. This overhead in the overall bit rate becomes worse for partition-based prediction or inverse mapping operations, as the overhead may be proportional to the number of partitions in each of individual image frames. At the very low bit rate for relatively low resolution video streaming (e.g., <1 Mbps, a resolution of 640×340 at 800 kbps, a resolution of 384×216 at 150 kbps, etc.), the overhead is very significant (e.g., >50%, etc.).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2 illustrates an example 3D cube that can be used to generate a 3D lookup table for prediction (or inverse mapping) operations;

FIG. 5A and FIG. 5B illustrate example process flows;

DESCRIPTION OF EXAMPLE EMBODIMENTS

Figure 1A:
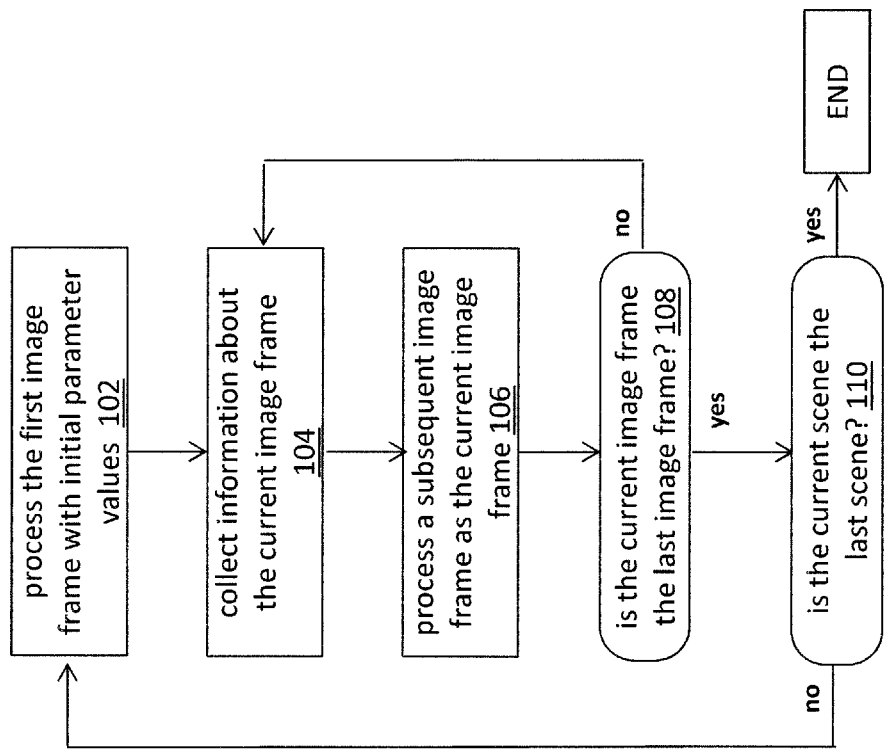
FIG. 1A and FIG. 1B illustrate example methods for generating prediction (or inverse mapping) parameters.

Example embodiments, which relate to encoding, decoding, and representing video images, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. MULTI-LAYER VIDEO SIGNALS
3. SELF-ADAPTIVE PREDICTION IN TEMPORAL DOMAIN
4. FRAME-LEVEL PREDICTOR IN TEMPORAL DOMAIN
5. COEFFICIENT GENERATION USING ALL PREVIOUS FRAMES
6. COEFFICIENT GENERATION USING SLIDING WINDOW
7. NON-POLYNOMIAL PREDICTORS
8. SELF-ADAPTIVE PREDICTION IN A SPATIAL DOMAIN
9. PARTITION-LEVEL PREDICTOR
10. NEIGHBORING PARTITIONS
11. RECURSIVE LEAST SQUARE SOLUTION
12. MULTI-LAYER VIDEO ENCODING
13. MULTI-LAYER VIDEO DECODING
14. EXAMPLE PROCESS FLOWS
15. IMPLEMENTATION MECHANISMS—HARDWARE OVERVIEW
16. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment.

Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

In some embodiments, multi-layer codecs may be used to generate or process a media signal comprising compressed images (e.g., video images) for a wide variety of displays (e.g., VDR displays, etc.). To provide superior visual quality on a wide variety of wide and low dynamic range displays, video content to be released to downstream devices can be quantized and encoded by a multi-layered codec implementing self-adaptive prediction techniques as described herein.

As used herein, the term "multi-layer codec" may refer to a multi-layer encoder or decoder that implements a structure of multiple layers in an audio visual signal (e.g., a bitstream, a broadcast signal, a media file, etc.). The multiple layers comprise a base layer and one or more enhancement layers. The base and enhancement layers comprise image data derived from the same source images. Image data in the base layer contains compressed image data of a low or partial dynamic range, which may not be optimized for rendering on displays of a relatively low dynamic range such as a standard dynamic range, an intermediate high dynamic range, etc. Image data in the multiple layers in combination contains compressed images of a wide dynamic range, which can be decoded and viewed on displays of a relatively wide dynamic range such as a visual dynamic range or VDR.

A multi-layer codec as described herein may be implemented with two or more lower bit depth (e.g., 8 bits, etc.) codecs (e.g., gamma-domain codecs, etc.) in the multiple layers in order to support higher bit depth (e.g., 12+ bits, etc.) images in the multiple layers as a whole and to support lower bit depth (e.g., 8 bits, etc.) images in the base layer.

Codecs implementing techniques as described herein may be further configured to include inter-layer prediction capabilities to fully exploit statistical redundancy between base layer (BL) image data and original input image data. EL image data may (possibly only) carry residual (or differential) image data, instead of carrying a large amount of wide dynamic range image data without exploiting correlations and statistical redundancy in image data of different layers.

Under some approaches, a recipient decoding system can use inverse mapping parameters carried with a media data stream to inversely map a BL image decoded from BL image data in the media data stream (e.g., a bitstream at a certain bit rate, etc.) to a predicted VDR image, which can be combined with a residual image decoded from EL image data to reconstruct a VDR image. As used herein, inverse mapping may refer to operations that map a relatively low dynamic range image (e.g., an SDR image, an intermediate VDR image, etc.) or a partition thereof to a relatively high dynamic image (e.g., a VDR image, etc.) or a partition thereof.

Techniques as described herein can be used to generate inverse mapping parameters for most if not all images carried in a media data stream without requiring the media data stream to carry the inverse mapping parameters (e.g., as metadata, as side information, etc.). A video codec (e.g., a video decoder, a VDR decoder, a VDR backward compatible (BC) video codec, etc.) may generate these inverse mapping parameters based on self-adaptive prediction in either temporal or spatial domain.

Inverse mapping parameters for each image frame within a scene can be roughly similar among image frames within the same scene. In some embodiments, a single set of inverse mapping parameters can be used for decoding all image frames within the entire scene. However, this approach may not fully exploit performance gains that may be obtained for each individual image frame within the scene, and results in a relatively low performance in rate distortion optimization. This approach becomes even less efficient when a scene is relatively long or when scene content keeps changing. In scenes in which color grading uses special editing effects, such as fade in and fade out, or graded from the interpolation of color grading parameters along time domain, scene-based prediction results in a relatively low coding efficiency.

In contrast, under the techniques as described herein, inverse mapping parameters for each of individual images in a scene are not transmitted from an upstream video encoder to a downstream video decoder. One or more video codecs as described herein, such as one or more of upstream video encoders, downstream video decoders, intermediate transcoders, etc., can implement respective self-adaptive processes to generate the inverse mapping parameters for individual images in a scene. For instance, inverse mapping parameters can be adjusted for each image frame of a scene to adapt to statistics up to one or more (e.g., most, etc.) current image frames within the scene, up to one or more (e.g., most, etc.) current partitions within a current image frame of the scene, etc. As a result, better prediction and thus better rate distortion optimization can be achieved under the techniques as described herein than other approaches that do not implement these techniques. As used herein, while "a current image frame" or "a current partition within a current image frame" may refer to a time-related order such as an image rendering order or a display order, as well as may refer to a time-related order such as a decoding order, a time-related order other than the display order or the decoding order, etc.; in some embodiments, "a current image frame" or "a current partition within a current image frame" may also refer to a non-time-related order such as a spatial order, a spatial coordinate order, etc.

Techniques for generating inverse mapping parameters, as described herein, can operate in a time domain, a spatial domain, a combination of time and spatial domains, etc. In an example, inverse mapping parameters such as predictor coefficients, etc., can be estimated image by image for up to all images in a scene. Such estimation of inverse mapping parameters for an image can take advantage of any reconstructed image data that may be available in one or more other images of the same scene. In another example, different regions of an image may be color graded with different color grading parameters. Inverse mapping parameters can be estimated partition by partition in the image. Such estimation of inverse mapping parameters for a partition of an image can take advantage of any reconstructed image data that may be available in one or more other partitions (e.g., neighboring partitions, etc.) in the same image. As a result of applying these techniques, overheads for transmitting inverse mapping parameters in a media data stream between upstream devices and downstream devices can be significantly reduced.

Techniques as described herein can be implemented in backward compatible multi-layer video codecs. A backward compatible (BC) multi-layer video codec supports encoding or decoding a video signal in which BL data comprises SDR images optimized for viewing on SDR displays. Additionally, optionally, or alternatively, some or all of these techniques can be used with a wide variety of inverse mapping operations such as prediction methods implemented in the Dolby BC codec developed by Dolby Laboratories Inc., San Francisco, Calif.; prediction methods implemented in a non-Dolby codec; prediction methods based on polynomials, piece-wise linear relationships, lookup tables, other functions, etc.; etc.

Data needed for other applications (including but not limited to those not related to filtering operations, etc.) may also be included with base layer and enhancement layer image data to be delivered from an upstream device to a downstream device. Additional features and/or orthogonal features may be supported by the base and enhancement layers as described herein.

In some example embodiments, mechanisms as described herein form a part of a media processing system, including but not limited to any of: video processing system, video codec system, studio system, streaming server, cloud-based content service system, a handheld device, game machine, television, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Multi-Layer Video Signals

Techniques (e.g., methods, algorithms, process flows, etc.) as described herein can be used by a multi-layer encoder to encode source video content into a multi-layer video signal. In some embodiments, the source video content is originally encoded with the source code words in a source encoding format (e.g., as defined by a VDR specification, etc.) based on video encoding techniques (e.g., VDR encoding techniques developed by Dolby Laboratories, Inc., San Francisco, Calif., etc.).

The multi-layer video signal generated by a multi-layer encoder as described herein can be transmitted directly or indirectly to or received by a wide variety of downstream devices including but not limited to, any of: display systems with multi-layer decoders, display systems with base-layer decoders, etc.

A downstream device (e.g., a multi-layer decoder, etc.) that supports relatively wide dynamic range display operations can derive and/or render a wide dynamic range version of the source video content based on the received multi-layer video signal. A downstream device (e.g., a BL decoder, etc.) that supports relatively low dynamic range display operations can derive and/or render a decoded low dynamic range version with visual details of the source video content based on BL image data of the received multi-layer video signal.

3. Self-Adaptive Prediction in Temporal Domain

FIG. 1A illustrates an example method for generating prediction (or inverse mapping) parameters in a temporal domain. In some embodiments, a video codec (e.g., a video encoder, a video decoder, etc.) as described herein may be configured to perform the method.

In block 102, the video codec processes the first image frame (denoted as image frame 0) in a current scene (or a group of pictures (GOP)) as the current image frame, and sets one or more initial parameters for prediction or inverse mapping operations (e.g., as a function, as a lookup table, etc.) for image frame 0 in the current scene.

In an example, the initial parameters for image frame 0 can be derived from, or set to, default values, which may represent one or more default predictors. Examples of default predictors include but are not limited to: linear predictors each of which linearly maps input code words in an input range to inversely mapped values in an output range, etc. In some embodiments, a downstream recipient device can use the same default predictor or the same set of default values to perform the prediction or inverse mapping operations for the first image frame in the current scene without receiving any side information or metadata information.

In another example, multiple default predictors or multiple sets of default values are defined. One of the multiple default predictors or multiple sets of default values is selected as the one or more initial parameters for image frame 0. In some embodiments, a selected index that corresponds to a particular default predictor or a particular set of default values in these multiple default predictors or multiple sets of default values can be transmitted in a media data stream from an upstream device (e.g., a video encoder, etc.) to a downstream recipient device (e.g., a video decoder, etc.) so that the downstream recipient device can use the same default predictor or the same set of default values to perform the prediction or inverse mapping operations for the first image frame in the current scene.

In a further example, up to a complete set of the initial parameters (which may or may not be default values) for image frame 0 in the current scene is transmitted in a media data stream from an upstream device (e.g., a video encoder, etc.) to a downstream recipient device (e.g., a video decoder, etc.) so that the downstream recipient device can use the same initial parameters to perform the prediction or inverse mapping operations for the first image frame in the current scene.

In block 104, the video codec collects information about the current image frame. Examples of the collected information may include, but are not limited to, any of: BL and reconstructed VDR data, BL and reconstructed VDR statistics, updated BL and reconstructed VDR intermediate data, etc.

In block 106, the video codec processes a subsequent image frame (e.g., an image frame other than the first image frame, etc.) denoted as image frame j in the current scene, and obtains one or more subsequent parameters for prediction or inverse mapping operations for image frame j in the current scene based on the collected information (e.g., the BL and reconstructed VDR, etc.) from already processed image frames in the current scene data.

In an example, the subsequent parameters for prediction or inverse mapping operations for image frame j in the current scene can be obtained via a growing look-back window (infinite-impulse-response like) with all accumulated collected information from already processed image frames in the current scene. The accumulated collected information may comprise information derived from image frame 0 to image frame j−1.

In another example, the subsequent parameters for prediction or inverse mapping operations for image frame j in the current scene can be obtained via a sliding window (finite-impulse-response like) with accumulated collected information from up to a certain number of already processed most recent image frames in the current scene. The accumulated collected information may comprise information derived from image frame j−W to image frame j−1, where W is a positive integer and denotes the size of the sliding window.

A growing look back window as described herein may comprise relatively stable parameters and is thus more suitable in a scene with relatively slowly changing images. A sliding window as described herein may comprise relatively dynamic parameters and is thus more suitable in a scene with relatively fast changing images.

In block 108, the video codec determines whether image frame j is the last image frame to be processed in the current scene.

In response to determining that image frame j is the last image frame to be processed in the current scene, the process flow goes to block 110. In block 110, the video codec determines whether the current scene is the last scene to be processed for the media data stream. In response to determining that the current scene is the last scene to be processed for the media data stream, the process flow as described herein ends. In response to determining that the current scene is not the last scene to be processed for the media data stream, the video codec frees memory that has stored the collected information in the current scene; the process flow as described herein goes to block 102 to process the next scene as the current scene.

In block 108, in response to determining that image frame j is not the last image frame to be processed in the current scene, the process flow as described herein goes to block 104 to process the next image (or image frame j+1) in the current scene as the current image frame.

4. Frame-Level Predictor in Temporal Domain

Let $s_{ji}$ be a relatively low dynamic range (e.g., SDR, an intermediate VDR, etc.) pixel value for the $i^{th}$ pixel in image frame j. Let $v_{ji}$ be a VDR pixel value for the corresponding co-located pixel in image frame j. Let $\hat{v}_{ji}$ be a predicted VDR pixel value for the corresponding co-located pixel in image frame j. Suppose that there are P pixels in a given image frame such as image frame j. For the purpose of illustration only, $2^{nd}$ order polynomial prediction may be used; however, in other embodiments, polynomial prediction with an order other than a $2^{nd}$ order, non-polynomial prediction such as MMR prediction based on multi-channel multiple regression (MMR) models, etc., may be used in place of, or in addition to, polynomial prediction. For the $i^{th}$ pixel in image frame j, the predicted VDR pixel value may be derived using a 2nd order polynomial as follows:

$$\hat{v}_{hi} = m_{j0} + m_{j1} \cdot s_{ji} + m_{j2} \cdot (s_{ji})^2 \quad (1)$$

In some embodiments, predictor coefficients $m_{j0}$, $m_{j1}$, and $m_{j2}$, can be determined or estimated based on collected information accumulated from previous image frames, as will be further discussed in detail. Thus, expression (1) represents a polynomial predictor for mapping relatively low dynamic range pixel values $s_{ji}$ to predicted VDR pixel value $\hat{v}_{ji}$.

Expression (1) can be alternatively expressed in a matrix form as follows:

$$\begin{bmatrix} \hat{v}_{j0} \\ \hat{v}_{j1} \\ \hat{v}_{j2} \\ \vdots \\ \hat{v}_{j,P-1} \end{bmatrix} = \begin{bmatrix} 1 & s_{j0} & s_{j0}^2 \\ 1 & s_{j1} & s_{j1}^2 \\ 1 & s_{j2} & s_{j2}^2 \\ \vdots & \vdots & \vdots \\ 1 & s_{j,P-1} & s_{j,P-1}^2 \end{bmatrix} \begin{bmatrix} m_{j0} \\ m_{j1} \\ m_{j2} \end{bmatrix} \quad (2)$$

or $$\hat{v}_j = S_j m_j \quad (3)$$

where $$\hat{v}_j = \begin{bmatrix} \hat{v}_{j0} \\ \hat{v}_{j1} \\ \hat{v}_{j2} \\ \vdots \\ \hat{v}_{j,P-1} \end{bmatrix}, S_j = \begin{bmatrix} 1 & s_{j0} & s_{j0}^2 \\ 1 & s_{j1} & s_{j1}^2 \\ 1 & s_{j2} & s_{j2}^2 \\ \vdots & \vdots & \vdots \\ 1 & s_{j,P-1} & s_{j,P-1}^2 \end{bmatrix}, m_j = \begin{bmatrix} m_{j0} \\ m_{j1} \\ m_{j2} \end{bmatrix} \quad (4)$$

In some embodiments, predictor coefficients $m_{j0}$, $m_{j1}$, and $m_{j2}$, can be determined or estimated in a minimization problem of an error function (or cost function). For example, predictor coefficients $m_{j0}$, $m_{j1}$, and $m_{j2}$ can be determined or estimated in a least squared solution to a cost or error function (note that one or more other error minimization algorithms can also be used to determine or estimate predictor coefficients as described herein), as represented by the following expression:

$$m_j = ((S_j)^T (S_j))^{-1} ((S_j)^T v_j) \quad (5)$$

where $$v_j = \begin{bmatrix} v_{j0} \\ v_{j1} \\ v_{j2} \\ \vdots \\ v_{j,P-1} \end{bmatrix} \quad (6)$$

where $v_j$ is the original VDR pixel value.

Prediction errors (residuals) between original VDR pixel values, $v_{ji}$, and predicted VDR pixel values, $\hat{v}_{ji}$, can be represented by the following expression:

$$e_{ji} = v_{ji} - \hat{v}_{ji} \quad (7)$$

or $$e_j = v_j - \hat{v}_j = \begin{bmatrix} v_{j0} \\ v_{j1} \\ v_{j2} \\ \vdots \\ v_{j,P-1} \end{bmatrix} - \begin{bmatrix} \hat{v}_{j0} \\ \hat{v}_{j1} \\ \hat{v}_{j2} \\ \vdots \\ \hat{v}_{j,P-1} \end{bmatrix} \quad (8)$$

The residuals can be compressed (e.g., lossy compression, etc.) by an upstream device such as a video encoder, etc., and the residuals as compressed can be transmitted to downstream recipient devices such as video decoders, etc. Reconstructed residuals denoted as $\tilde{e}_{ji}$ can be obtained (e.g., by a downstream recipient device, etc.) from decoding and decompressing the compressed residuals (e.g., obtained previously by the upstream device via lossy compression, etc.) as follows:

$$\tilde{e}_j = EL\_decomp(EL\_comp(e_j)) \quad (9)$$

A reconstructed VDR image can be obtained as follows:

$$\tilde{v}_{ji} = \hat{v}_{ji} + \tilde{e}_{ji} \quad (10)$$

or $$\tilde{v}_j = \hat{v}_j + \tilde{e}_j \quad (11)$$

Given relatively low dynamic range pixel values $s_{ji}$, and reconstructed VDR pixel values $\tilde{v}_{ji}$, actual predictor coefficients can be determined for image frame j. For reasons of brevity, the following notations may be used:

$$B_j = (S_j)^T (S_j) \quad (12)$$

and $$a_j = (S_j)^T \tilde{v}_j \quad (13)$$

In some embodiments, predictor coefficients to be used in image frame j+1 may be derived as follows:

$$m_{j+1} = (B_j)^{-1} a_j \quad (14)$$

The above discussion shows how predictor coefficients may be obtained for image frame j+1 based at least in part on image data from image frame j.

5. Coefficient Generation Using All Previous Frames

In some embodiments, predictor coefficients can also be obtained as a recursive least squared solution based at least in part on image data from image frame 0 to image frame j in a look-back window. The look-back window may grow under an IIR-like approach. Matrix B in expression (12) and vector a in expression (13) can be updated in each image frame when new (e.g., reconstructed, etc.) image data becomes available.

In some embodiments, matrix B in expression (12) and vector a in expression (13) for image frame 0 can be set as an initial condition as in expressions (15) and (16), for example with initial parameters for the first image frame within the current scene, as follows:

$$B_{0,0} = (S_0)^T (S_0) \quad (15)$$

$$a_{0,0} = (S_0)^T \tilde{v}_0 \quad (16)$$

Predictor coefficients for image frame 1 may be derived as follows:

$$m_1 = (B_0)^{-1} a_0 \quad (17)$$

Matrix B in expression (12) and vector a in expression (13) for image frame j, and predictor coefficients for image frame j+1 can be further derived as follows:

$$B_{0,j} = B_{0,j-1} + (S_j)^T S_j \quad (18)$$

$$a_{0,j} = a_{0,j-1} + (S_j)^T \tilde{v}_j \quad (19)$$

$$m_{j-1} = (B_{0j})^{-1} a_{0j} \quad (20)$$

6. Coefficient Generation Using Sliding Window

In some embodiments, predictor coefficients can be obtained as an iterative least squared solution based at least in part on image data from image frames in a sliding window. The number of image frames in a sliding window may be capped under a FIR-like approach. Matrix B in expression (12) and vector a in expression (13) can be computed or updated in each image frame when new (e.g., reconstructed, etc.) image data becomes available. Collected information from image frames in the sliding window can be used to compute predictor coefficients. The collected information may comprise relatively low dynamic range image data as represented by $s_{ji}$, reconstructed VDR image data as represented by $\tilde{v}_{ji}$, from image frame j–F to image frame j. In some embodiments, a ring buffer may be allocated in memory to store all pixel values (e.g., the relatively low dynamic range image data, the reconstructed VDR image data, etc.) for (F+1) image frames in the sliding window, which may be represented in the following expressions:

$$S_{j-F,j} = \begin{bmatrix} S_{j-F} \\ S_{j-F+1} \\ \vdots \\ S_j \end{bmatrix} \quad (21)$$

and $$\tilde{v}_{j-F,j} = \begin{bmatrix} \tilde{v}_{j-F} \\ \tilde{v}_{j-F+1} \\ \vdots \\ \tilde{v}_j \end{bmatrix} \quad (22)$$

Based on the collected information in the sliding window, matrix B in expression (12) and vector a in expression (13) can be computed as follows:

$$B_{j-F,j} = (S_{j-F,j})^T (S_{j-F,j}) \quad (23)$$

and $$a_{j-F,j} = (S_{j-F,j})^T \tilde{v}_{j-F,j} \quad (24)$$

Thus, predictor coefficients to be used in image frame j+1 can be derived as follows:

$$m_{j+1} = (B_{j-F,j})^{-1} a_{j-F,j} \quad (25)$$

In some embodiments, predictor coefficients for image frames can be updated following a decoding order in which EL and/or BL image data for the image frames is decoded from a multi-layer video signal, a display order in which the image frames are to be rendered, or an order other than the decoding order and the display order.

In some embodiments, EL coding parameter such as pivots, maximum and/or minimum values, offsets, levels (or slopes), etc., may be collected for a scene in a first coding pass, and used to code EL image data (e.g., residuals, etc.) in a second coding pass. The first pass is to run the entire scene (e.g., non-recursively, etc.) to collect EL statistics for each scene for the EL image data (e.g., the residuals, etc.). In some embodiments, the EL statistics can be used to generate the EL encoding parameters for EL image data coding as well as inverse mapping parameters for inverse mapping or prediction operations.

7. Non-Polynomial Predictors

Non-polynomial predictors, such as three dimensional lookup table (3D-LUT), etc., may be used in place of, or in addition to, polynomial predictors for prediction or inverse mapping operations. These non-polynomial predictors can be applied with a growing lookback window (similar to IIR) or a sliding window (similar to FIR).

In some embodiments, a 3D cube such as illustrated as 202 in FIG. 2 may be built on a domain of relatively low dynamic range pixel values (e.g., SDR pixel values, an intermediate VDR pixel values, etc.). Each dimension of the 3D cube represents each color channel (e.g., one of Y, Cb, Cr, etc.) of a color space (e.g., a YCbCr color space, etc.) used by the relatively low dynamic range pixel values. In some embodiments, possible component pixel values in a color channel corresponding to each dimension of the 3D cube can be segmented into N partitions. Accordingly, the 3D cube comprises N×N×N partitions. A set of relatively low dynamic range pixel values that are located at partition k of the 3D cube for image frame j is denoted as set $\Phi_{jk}$. As shown in FIG. 2, the 3D cube (202) comprises an example partition 204 among N partitions.

The average VDR pixel values in partition k of the 3D cube computed from VDR pixel values corresponding to the relatively low dynamic range pixels values in set $\Phi_{jk}$ can be used as an optimal solution for a predicted VDR pixel value of a relatively low dynamic range pixel value in partition k, as follows:

$$\hat{v}_{jk} = \frac{1}{|\Phi_{jk}|} \sum_{s_{ji} \in \Phi_{jk}} v_{ji} \qquad (26)$$

Based on expression (26), the 3D-LUT ($\hat{v}_{jk}$) can be built for all N×N×N partitions.

Under an IIR-like approach, predicted VDR pixel values in the 3D-LUT can be obtained as average values among VDR pixel values (e.g., reconstructed VDR pixel values, etc.) corresponding to the relatively low dynamic range pixels values in set $\Phi_{jk}$ for all image frames up to image frame j within a scene, as follows:

$$\hat{v}_{jk} = \frac{\sum_{m=0}^{j} \sum_{s_{mi} \in \Phi_{mk}} v_{mi}}{\sum_{m=0}^{j} |\Phi_{mk}|} \qquad (27)$$

Under an FIR-like approach, predicted VDR pixel values in the 3D-LUT can be obtained (e.g., by an upstream device, etc.) as average values among VDR pixel values (e.g., reconstructed VDR pixel values, etc.) corresponding to the relatively low dynamic range pixels values in set $\Phi_{jk}$ for image frame j−F to image frame j within a scene, where F is a positive integer, as follows:

$$\hat{v}_{(j-F,j)k} = \frac{\sum_{m=j-F}^{j} \sum_{s_{mi} \in \Phi_{mk}} v_{mi}}{\sum_{m=j-F}^{j} |\Phi_{mk}|} \qquad (28)$$

In some embodiments, the predicted values in the 3D-LUT can be applied in prediction or inverse mapping operations for image frame (j+1).

8. Self-Adaptive Prediction in a Spatial Domain

Figure 1B:
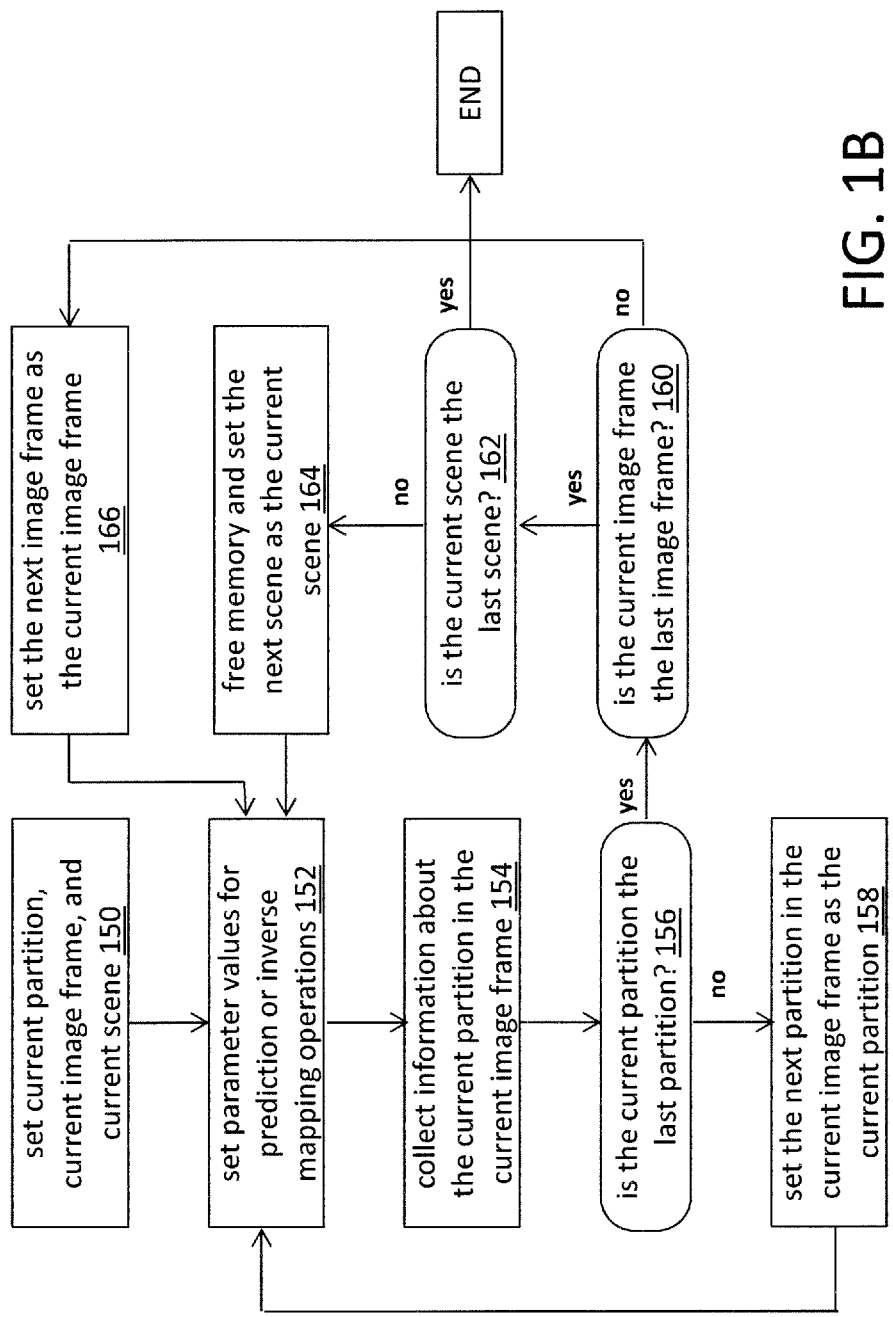

FIG. 1B illustrates an example method for generating prediction (or inverse mapping) parameters in a spatial domain. In some embodiments, a video codec (e.g., a video encoder, a video decoder, etc.) as described herein may be configured to perform the method. In some embodiments, an image frame as described herein can be partitioned into multiple partitions (e.g., overlapping partitions, non-overlapping partitions, etc.). Self-adaptive prediction operations in a spatial domain as described herein may be similar to those in a time domain, but with finer memory accesses to collected information at the partition level.

In block 150, the video codec sets the first image (or image frame 0) as the current image frame in a current scene (or a group of pictures (GOP)), processes the first partition (e.g., the first block, etc.) in image frame 0 as the current partition.

In block 152, the video codec sets one or more parameters for prediction or inverse mapping operations (e.g., as a function, as a lookup table, etc.) for the current partition in the current image frame in the current scene.

If the current partition is the first partition in image frame 0, the video codec sets one or more initial parameters as the one or more parameters.

In an example, the initial parameters for the first partition in image frame 0 can be derived from, or set to, default values, which may represent one or more default predictors. Examples of default predictors include but are not limited to, linear predictors each of which linearly maps input code words in an input range to inversely mapped values in an output range. In some embodiments, a downstream recipient device can use the same default predictor or the same set of default values to perform the prediction or inverse mapping operations for the first partition in image frame 0 in the current scene without receiving any side information or metadata information.

In another example, multiple default predictors or multiple sets of default values are defined. One of the multiple default predictors or multiple sets of default values is selected as the one or more initial parameters for the first partition in image frame 0. In some embodiments, a selected index that corresponds to a particular default predictor or a particular set of default values in these multiple default predictors or multiple sets of default values can be transmitted in a media data stream from an upstream device (e.g., a video encoder, etc.) to a downstream recipient device (e.g., a video decoder, etc.) so that the downstream recipient device can use the same default predictor or the same set of default values to perform the prediction or inverse mapping operations for the first partition in image frame 0 in the current scene.

In a further example, up to a complete set of the initial parameters (which may or may not be default values) for the first partition in image frame 0 in the current scene is transmitted in a media data stream from an upstream device (e.g., a video encoder, etc.) to a downstream recipient device (e.g., a video decoder, etc.) so that the downstream recipient device can use the same initial parameters to perform the prediction or inverse mapping operations for the first partition in image frame 0 in the current scene.

If the current partition (denoted as partition b, where b is an integer equal to or greater than 0) is not the first partition in an image frame (denoted as image frame j, where j is an integer equal to or greater than 0) other than image frame 0 in the current scene, the video codec derives the one or more parameters for prediction or inverse mapping operations for partition b in image frame j in the current scene based on the collected information (e.g., the BL and reconstructed VDR, etc.) from already processed partitions in the current scene.

In an example, the parameters for prediction or inverse mapping operations for partition b in image frame j in the current scene can be obtained via a growing look-back window (infinite-impulse-response like) with all accumulated collected information from already processed image frames in the current scene. The accumulated collected information may comprise information derived from the first partition in image frame 0 up to a partition preceding partition b in image frame j.

In another example, the parameters for prediction or inverse mapping operations for partition b in image frame j in the current scene can be obtained via a sliding window (finite-impulse-response like) with accumulated collected information from up to a certain number of already processed partitions in the current scene. The accumulated collected information may comprise information derived from partition j−W to partition j−1, where W is a positive integer and denotes the size of the sliding window.

A growing look back window as described herein may comprise relatively stable parameters and are thus more suitable in an image with relatively slowly changing image partitions. A sliding window as described herein may comprise relatively dynamic parameters and are thus more suitable in an image with relatively fast changing image partitions.

In some embodiments, the parameters for partition b in image frame j can be obtained at least in part from collected information in one or more neighboring partitions. In a particular embodiment, the parameters can be obtained at least in part from collected information in one or both of a top neighboring partition or a left neighboring partition, as will be further discussed in detail.

In block 154, the video codec collects information about the current partition in the current image frame in the current scene. Examples of the collected information may include, but are not limited to, any of: BL and reconstructed VDR data, BL and reconstructed VDR statistics, updated BL and reconstructed VDR intermediate data, etc.

In block 156, the video codec determines whether partition b in image frame j is the last partition in image frame j. In response to determining that partition b in image frame j is not the last partition in image frame j, the process flow goes to block 158. In block 158, the video codec sets the next partition in image frame j as the current partition; the process flow goes to block 152.

In response to determining that partition b in image frame j is the last partition in image frame j, the process flow goes to block 160. In block 160, the video codec determines whether image frame j is the last image frame in the current scene. In response to determining that image frame j is the last image frame in the current scene, the process flow goes to block 162. In block 162, the video codec determines whether the current scene is the last scene. In response to determining that the current scene is the last scene, the process flow ends. In response to determining that the current scene is not the last scene, the process flow goes to block 164. In block 164, the video codec frees memory that has stored the collected information in the current scene, sets the first partition in the first image frame in the next scene as the current partition, sets the first image in the next scene as the current image frame, and sets the next scene as the current scene; the process flow goes to block 152.

On the other hand, in response to determining that image frame j is not the last image frame in the current scene, the process flow goes to block 166. In block 166, the video codec sets the first partition in the next image frame as the current partition, and sets the next image frame in the current scene as the current image frame; the process flow goes to block 152.

9. Partition-Level Predictor

In some embodiments, each frame can be partitioned into $N_h \times N_w$ partitions ($N_h$ partitions vertically and $N_w$ horizontally). The algorithm used by partition-level prediction operations in a spatial domain may be similar to the algorithm used by frame-level prediction operations in a temporal domain. A partition index b may be used along with an image frame index j. For simplicity, the partition index b can be a raster-scan order index or an order based on a two-dimensional partition coordinate.

Let $s_{j,b,i}$ be a relatively low dynamic range (e.g., SDR, an intermediate VDR, etc.) pixel value for the $i^{th}$ pixel in the $b^{th}$ block of image frame j. Let $v_{j,b,i}$ be a VDR pixel value for the corresponding co-located pixel in the $b^{th}$ block of image frame j. Let $\hat{v}_{j,b,i}$ be a predicted VDR pixel value for the corresponding co-located pixel in the $b^{th}$ block of image frame j. Suppose that there are $P_b$ pixels in the $b^{th}$ block of image frame j. For the purpose of illustration only, polynomial prediction may be used; however, in other embodiments, non-polynomial prediction such as 3D-LUT and cross-color channel predictor, such as MMR prediction, etc., may be used in place of, or in addition to, polynomial prediction. For the $i^{th}$ pixel in the $b^{th}$ block of image frame j, the predicted VDR pixel value may be derived using a 2nd order polynomial as follows:

$$\hat{v}_{jbi} = m_{jb0} + m_{jb1} \cdot s_{jbi} + m_{jb2} \cdot (s_{jbi})^2 \qquad (29)$$

In some embodiments, predictor coefficients $m_{jb0}$, $m_{jb1}$, and $m_{jb2}$, can be determined or estimated based on collected information accumulated from previous image frames, as will be further discussed in detail. Thus, expression (29) represents a polynomial predictor for mapping relatively low dynamic range pixel values $s_{jbi}$ to predicted VDR pixel value $\hat{v}_{j,b,i}$.

Expression (29) can be alternatively expressed in a matrix form as follows:

$$\begin{bmatrix} \hat{v}_{jb0} \\ \hat{v}_{jb1} \\ \hat{v}_{jb2} \\ \vdots \\ \hat{v}_{j,b,P_b-1} \end{bmatrix} = \begin{bmatrix} 1 & s_{jb0} & s_{jb0}^2 \\ 1 & s_{jb1} & s_{jb1}^2 \\ 1 & s_{jb2} & s_{jb2}^2 \\ \vdots & \vdots & \vdots \\ 1 & s_{j,b,P_b-1} & s_{j,b,P_b-1}^2 \end{bmatrix} \begin{bmatrix} m_{jb0} \\ m_{jb1} \\ m_{jb2} \end{bmatrix} \qquad (30)$$

or $$\hat{v}_{jb} = S_{jb} m_{jb} \qquad (31)$$

where $$\hat{v}_{jb} = \begin{bmatrix} \hat{v}_{jb0} \\ \hat{v}_{jb1} \\ \hat{v}_{jb2} \\ \vdots \\ \hat{v}_{j,b,P_b-1} \end{bmatrix}, S_{jb} = \begin{bmatrix} 1 & s_{jb0} & s_{jb0}^0 \\ 1 & s_{jb1} & s_{jb1}^0 \\ 1 & s_{jb2} & s_{jb2}^0 \\ \vdots & \vdots & \vdots \\ 1 & s_{j,b,P_b-1} & s_{j,b,P_b-1}^2 \end{bmatrix} m_{jb} = \begin{bmatrix} m_{jb0} \\ m_{jb1} \\ m_{jb2} \end{bmatrix} \qquad (32)$$

In some embodiments, predictor coefficients $m_{jb0}$, $m_{jb1}$, and $m_{jb2}$, can be determined or estimated as a least squared solution to a cost function, as represented in the following expression:

$$m_{jb} = ((S_{jb})^T(S_{jb}))^{-1}((S_{jb})^T v_{jb}) \quad (33)$$

where $$S_{jb} = \begin{bmatrix} 1 & s_{jb0} & s^2_{jb0} \\ 1 & s_{jb1} & s^2_{jb1} \\ 1 & s_{jb2} & s^2_{jb2} \\ \vdots & \vdots & \vdots \\ 1 & s_{j,b,P_b-1} & s^2_{j,b,P_b-1} \end{bmatrix} \text{ and } v_{jb} = \begin{bmatrix} v_{jb0} \\ v_{jb1} \\ v_{jb2} \\ \vdots \\ v_{j,b,P_b-1} \end{bmatrix} \quad (34)$$

Prediction errors (residuals) between original VDR pixel values, $v_{jbi}$, and predicted VDR pixel values, $\hat{v}_{jbi}$, can be computed as follows:

$$e_{jbi} = v_{jbi} - \hat{v}_{jbi} \quad (35)$$

or $$e_{jb} = v_{jb} - \hat{v}_{jb} = \begin{bmatrix} v_{jb0} \\ v_{jb1} \\ v_{jb2} \\ \vdots \\ v_{j,b,P_b-1} \end{bmatrix} - \begin{bmatrix} \hat{v}_{jb0} \\ \hat{v}_{jb1} \\ \hat{v}_{jb2} \\ \vdots \\ \hat{v}_{j,b,P_b-1} \end{bmatrix} \quad (36)$$

The residuals can be compressed (e.g., lossy compression, etc.) by an upstream device such as a video encoder, etc.; and the residuals as compressed can be transmitted to downstream recipient devices such as video decoders, etc. Reconstructed residuals denoted as $\tilde{e}_{jb}$ can be obtained (e.g., by a downstream recipient device, etc.) from decoding and decompressing the compressed residuals (e.g., obtained previously by the upstream device via lossy compression, etc.) as follows:

$$\tilde{e}_{jb} = EL\_decomp(EL\_comp(e_{jb})) \quad (37)$$

A reconstructed VDR image can be obtained as follows:

$$\tilde{v}_{jbi} = \hat{v}_{jbi} + \tilde{e}_{jbi} \quad (38)$$

or $$\tilde{v}_{jb} = \hat{v}_{jb} + \tilde{e}_{jb} \quad (39)$$

10. Neighboring Partitions

Figure 3A:
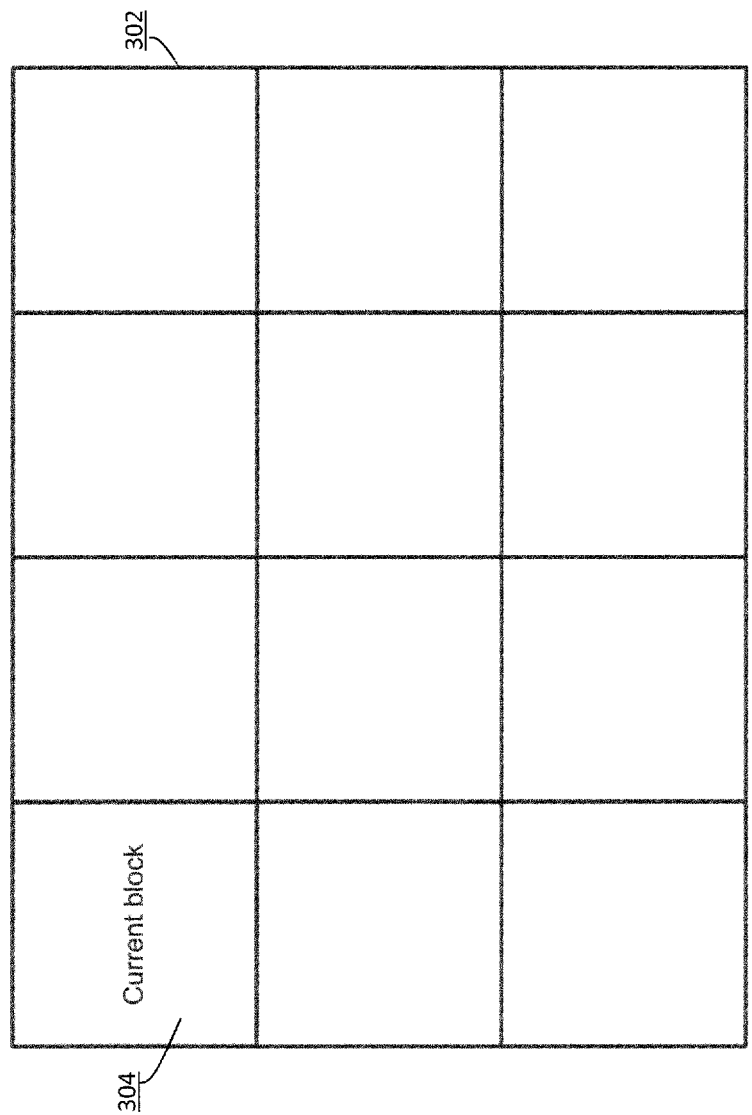
FIG. 3A through FIG. 3D illustrate example locations of a current partition in an image frame.

FIG. 3A illustrates a current partition (e.g., the current partition in the example method of FIG. 1B, etc.) as the first partition (denoted as 304 in FIG. 3A) in an image frame 302 (e.g., the current image frame in the example method of FIG. 1B, etc.). In some embodiments, prediction parameters such as predictor coefficients $m_{jb0}$, $m_{jb1}$, and $m_{jb2}$, for the first partition (304) can be assigned with default or non-default parameters that are explicitly signaled from an upstream device to a downstream recipient device. In some embodiments, prediction parameters such as predictor coefficients $m_{jb0}$, $m_{jb1}$, and $m_{jb2}$, for the first partition (304) can be assigned with default parameters that are implicitly signaled (e.g., with a selected index, etc.) from an upstream device to a downstream recipient device, or alternatively that are not signaled (e.g., a single set of default values known to both upstream and downstream devices, etc.) from an upstream device to a downstream recipient device.

Collected information related to various combinations of already processed neighboring partitions can be used to derive prediction or inverse mapping parameters as described herein.

Figure 3B:
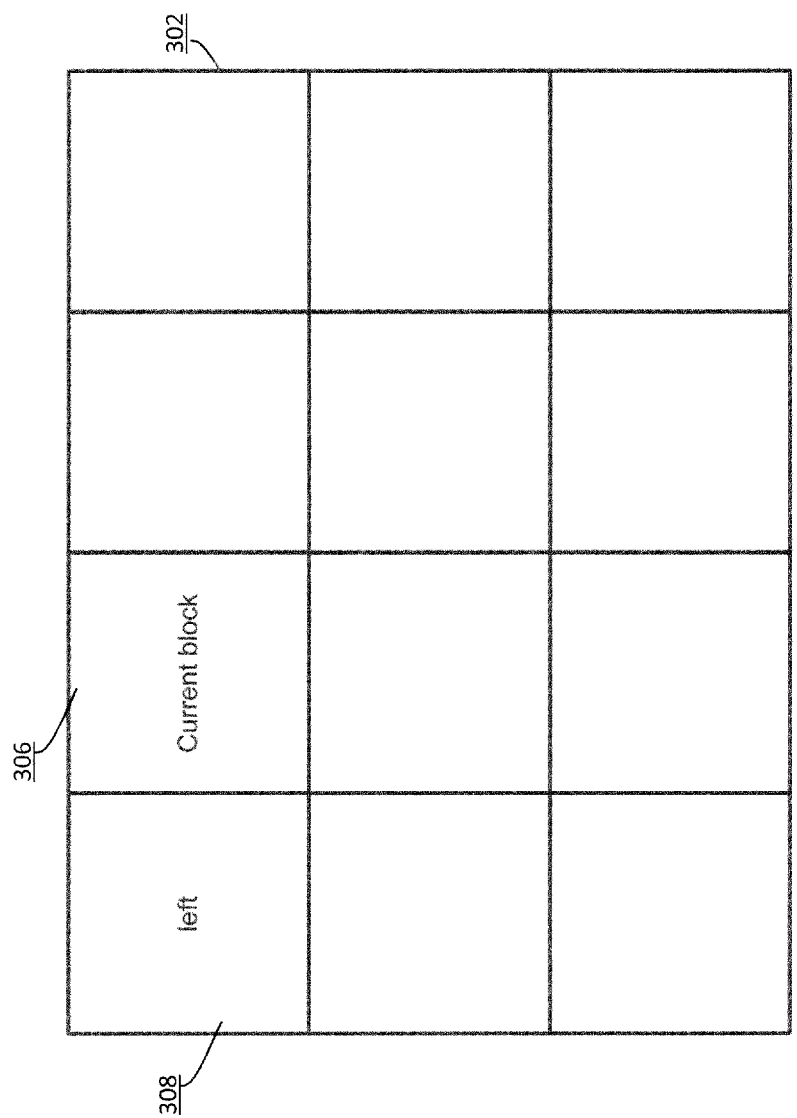

FIG. 3B illustrates a current partition (e.g., the current partition in the example method of FIG. 1B, etc.) as a first row partition 306 other than the first partition in the image frame (302) with a left neighboring partition (308). In some embodiments, prediction parameters such as predictor coefficients $m_{jb0}$, $m_{jb1}$, and $m_{jb2}$, for the first row partition (306) can be derived from the left neighboring partition (308) as follows:

$$B_{j,(0,1)} = (S_{j,(0,0)})^T (S_{j,(0,0)}) \quad (40)$$

$$a_{j,(0,1)} = (S_{j,(0,0)})^T \tilde{v}_{j,(0,0)} \quad (41)$$

$$m_{(0,1)} = (B_{j,(0,1)})^{-1} a_{j,(0,1)} \quad (42)$$

From expressions (40)-(42), predictor coefficients $m_{jb0}$, $m_{jb1}$, and $m_{jb2}$, for the w-th partition in the first row can be derived through further iterations/recursions with the following expressions:

$$B_{j,(0,w)} = (S_{j,(0,w-1)})^T (S_{j,(0,w-1)}) \quad (43)$$

$$a_{j,(0,w)} = (S_{j,(0,w-1)})^T \tilde{v}_{k,(0,w-1)} \quad (44)$$

$$m_{(0,w)} = (B_{j,(0,w)})^{-1} a_{j,(0,w)} \quad (45)$$

Figure 3C:
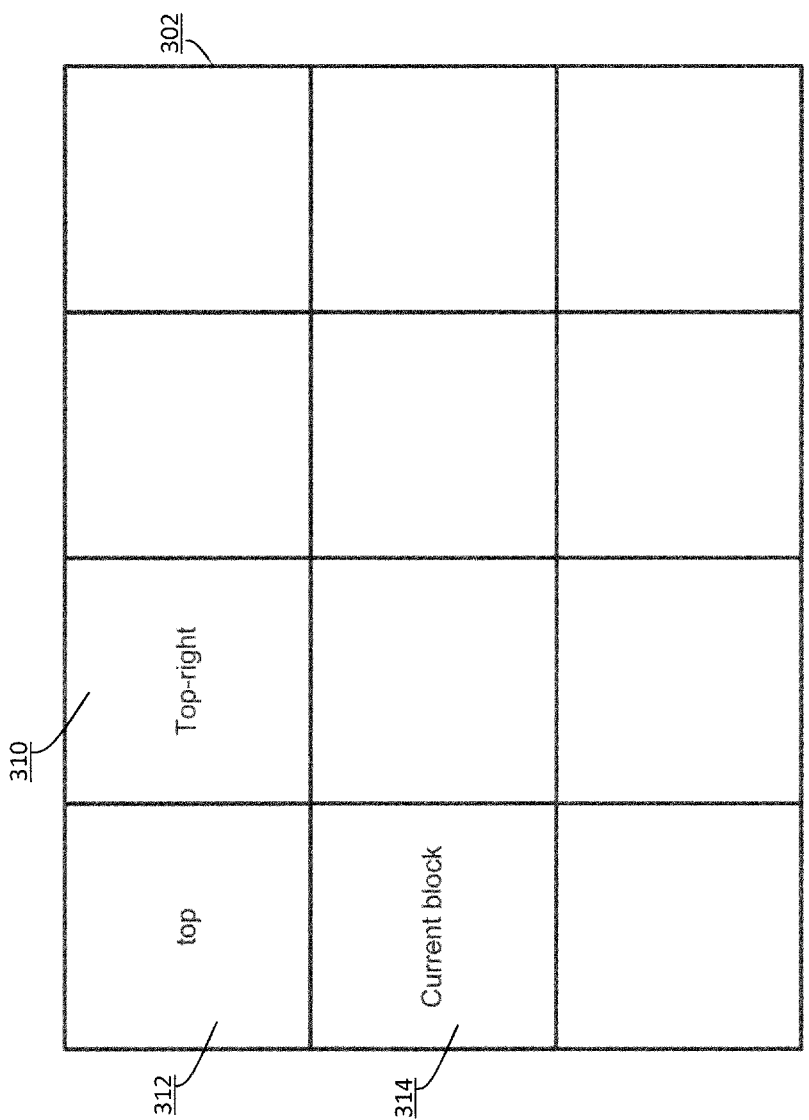

FIG. 3C illustrates a current partition (e.g., the current partition in the example method of FIG. 1B, etc.) as a non-first row partition 314 in the image frame (302) with a top-right neighboring partition (310) and a top neighboring partition (312).

In some embodiments, prediction parameters such as predictor coefficients $m_{jb0}$, $m_{jb1}$, and $m_{jb2}$, for the non-first row partition (314) can be derived from the top neighboring partition (312) as follows:

$$B_{j,(1,0)} = B_{j,(0,1)} = (S_{j,(0,0)})^T (S_{j,(0,0)}) \quad (46)$$

$$a_{j,(1,0)} = a_{j,(0,1)} = (S_{j,(0,0)})^T \tilde{v}_{j,(0,0)} \quad (47)$$

$$n_{(1,0)} = (B_{j,(1,0)})^{-1} a_{j,(1,0)} \quad (48)$$

In some embodiments, prediction parameters such as predictor coefficients $m_{jb0}$, $m_{jb1}$, and $m_{jb2}$, for the non-first row partition (314) can be derived from the top neighboring partition (312) and the top-right neighboring partition (310) as follows:

$$B_{j,(1,0)} = \left( \begin{bmatrix} S_{j,(0,0)} \\ S_{j,(0,1)} \end{bmatrix} \right)^T \left( \begin{bmatrix} S_{j,(0,0)} \\ S_{j,(0,1)} \end{bmatrix} \right) \quad (49)$$

$$a_{j,(1,0)} = \left( \begin{bmatrix} S_{j,(0,0)} \\ S_{j,(0,1)} \end{bmatrix} \right)^T \begin{bmatrix} \tilde{v}_{j,(0,0)} \\ \tilde{v}_{j,(0,1)} \end{bmatrix} \quad (50)$$

$$m_{(1,0)} = (B_{j,(1,0)})^{-1} a_{j,(1,0)} \quad (51)$$

Figure 3D:
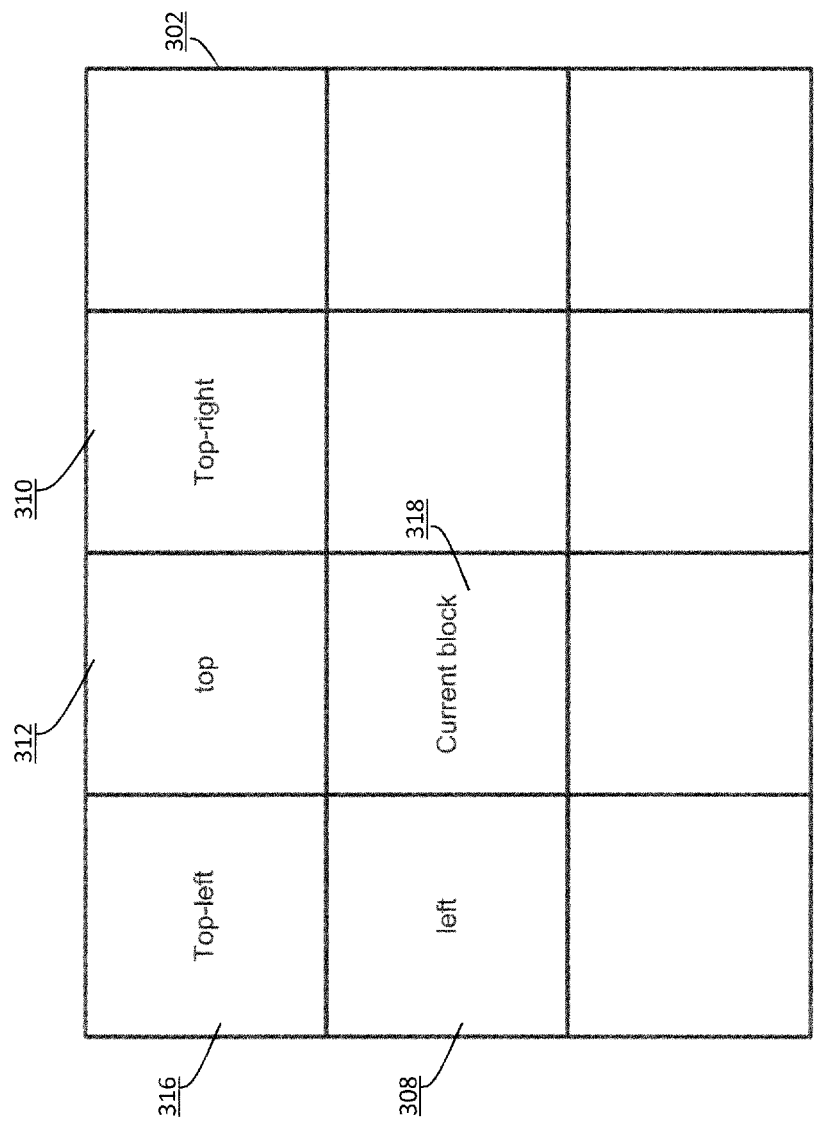

FIG. 3D illustrates a current partition (e.g., the current partition in the example method of FIG. 1B, etc.) as a non-first row partition 318 in the image frame (302) with a top-right neighboring partition (310), a top-left neighboring partition (316), a top neighboring partition (312), and a left neighboring partition (308).

In some embodiments, prediction parameters such as predictor coefficients $m_{jb0}$, $m_{jb1}$, and $m_{jb2}$, for the non-first row partition (318) can be derived with the top-left neighboring partition (316), the top neighboring partition (312), and the left neighboring partition (308), as follows:

$$B_{j,(h,w)} = \left(\begin{bmatrix} S_{j,(h-1,w-1)} \\ S_{j,(h,w-1)} \\ S_{j,(h-1,w)} \end{bmatrix}\right)^T \left(\begin{bmatrix} S_{j,(h-1,w-1)} \\ S_{j,(h,w-1)} \\ S_{j,(h-1,w)} \end{bmatrix}\right) \quad (52)$$

$$a_{j,(h,w)} = \left(\begin{bmatrix} S_{j,(h-1,w-1)} \\ S_{j,(h,w-1)} \\ S_{j,(h-1,w)} \end{bmatrix}\right)^T \begin{bmatrix} \tilde{v}_{j,(h-1,w-1)} \\ \tilde{v}_{j,(h,w-1)} \\ \tilde{v}_{j,(h-1,w)} \end{bmatrix} \quad (53)$$

$$m_{(h,w)} = (B_{j,(h,w)})^{-1} a_{j,(h,w)} \quad (54)$$

In some embodiments, prediction parameters such as predictor coefficients $m_{jb0}$, $m_{jb1}$, and $m_{jb2}$, for the non-first row partition (318) can be derived with the top-right neighboring partition (310), the top-left neighboring partition (316), the top neighboring partition (312), and the left neighboring partition (308), as follows:

$$B_{j,(h,w)} = \left(\begin{bmatrix} S_{j,(h-1,w-1)} \\ S_{j,(h,w-1)} \\ S_{j,(h-1,w)} \\ S_{j,(h-1,w+1)} \end{bmatrix}\right)^T \left(\begin{bmatrix} S_{j,(h-1,w-1)} \\ S_{j,(h,w-1)} \\ S_{j,(h-1,w)} \\ S_{j,(h-1,w+1)} \end{bmatrix}\right) \quad (55)$$

$$a_{j,(h,w)} = \left(\begin{bmatrix} S_{j,(h-1,w-1)} \\ S_{j,(h,w-1)} \\ S_{j,(h-1,w)} \\ S_{j,(h-1,w+1)} \end{bmatrix}\right)^T \begin{bmatrix} \tilde{v}_{j,(h-1,w-1)} \\ \tilde{v}_{j,(h,w-1)} \\ \tilde{v}_{j,(h-1,w)} \\ \tilde{v}_{j,(h-1,w+1)} \end{bmatrix} \quad (56)$$

$$m_{(h,w)} = (B_{j,(h,w)})^{-1} a_{j,(h,w)} \quad (57)$$

Techniques as described herein can be applied to partitions in various boundary conditions in an image frame. For example, in some embodiments, a partition may be at a boundary (e.g., at the end of a row, etc.) that does not have a top-right neighbor. In various embodiments, the combinations of neighboring partitions as represented by the above expressions and other combinations of neighboring partitions other than those underlying the above expressions may also be used to derive values of prediction or inverse mapping parameters as described herein.

In some embodiments, techniques as described herein can be applied to other types of predictors other than a polynomial-based predictor, such as 3D-LUT, etc. Values (e.g., average pixel values) that are used in other types of predictors for a partition of an image frame can be estimated or derived based at least in part on collected information related to one or more neighboring partitions.

Techniques as described herein can be used to prevent or reduce boundary discontinuity from appearing in a reconstructed image. In some embodiments, partitions in an image frame can overlap with each other for the purpose of preventing or reducing boundary discontinuity artifacts.

11. Recursive Least Square Solution

For the purpose of illustration, predictor coefficients for a $2^{nd}$ order polynomial predictor are derived as the least squared error solution under an (IIR-like) approach that uses a growing look-back window. The least squared solution can start from the first image frame of a scene. For simplicity, predictor coefficients for image frame j are generated from collected information related to image frames before frame j.

In some embodiments, the least squared solution for the first image frame is for the problem formulated as follows:

$$\hat{v}_0 = S_0 m_0 \quad (58)$$

$$B_0 = (S_0)^T (S_0) \quad (59)$$

$$a_0 = (S_0)^T v_0 \quad (60)$$

Accordingly, predictor coefficients for the first image frame can be derived as the least squared solution to the problem (expressions (58)-(60)) as formulated above, as follows:

$$m_0 = (B_0)^{-1} a_0 \quad (61)$$

The least squared solution for the second image frame is for the problem formulated as follows:

$$\begin{bmatrix} \hat{v}_0 \\ \hat{v}_1 \end{bmatrix} = \begin{bmatrix} S_0 \\ S_1 \end{bmatrix} m_{01} \quad (62)$$

$$B_{01} = [(S_0)^T \; (S_1)^T] \begin{bmatrix} S_0 \\ S_1 \end{bmatrix} \quad (63)$$

$$a_{01} = [(S_0)^T \; (S_1)^T] \begin{bmatrix} v_0 \\ v_1 \end{bmatrix} \quad (64)$$

Accordingly, predictor coefficients for the second image frame can be derived as the least squared solution to the problem (expressions (62)-(64)) as formulated above, as follows:

$$m_{01} = (B_{01})^- a_{01} \quad (65)$$

The least squared solution for the third image frame is for the problem formulated as follows:

$$\begin{bmatrix} \hat{v}_0 \\ \hat{v}_1 \\ \hat{v}_2 \end{bmatrix} = \begin{bmatrix} S_0 \\ S_1 \\ S_2 \end{bmatrix} m_{02} \quad (66)$$

$$B_{02} = [(S_0)^T \; (S_1)^T \; (S_2)^T] \begin{bmatrix} S_0 \\ S_1 \\ S_2 \end{bmatrix} \quad (67)$$

$$a_{02} = [(S_0)^T \; (S_1)^T \; (S_2)^T] \begin{bmatrix} v_0 \\ v_1 \\ v_2 \end{bmatrix} \quad (68)$$

Accordingly, predictor coefficients for the third image frame can be derived as the least squared solution to the problem (expressions (66)-(68)) as formulated above, as follows:

$$m_{02} = (B_{02})^{-1} a_{02} \quad (69)$$

The least squared solution for the j-th image frame is for the problem formulated as follows:

$$\begin{bmatrix} \hat{v}_0 \\ \hat{v}_1 \\ \vdots \\ \hat{v}_j \end{bmatrix} = \begin{bmatrix} S_0 \\ S_1 \\ \vdots \\ S_j \end{bmatrix} m_{0j} \quad (70)$$

$$B_{0j}[\ (S_0)^T\ (S_1)^T\ \ldots\ (S_j)^T\ ]\begin{bmatrix}S_0\\S_1\\\vdots\\S_j\end{bmatrix} \quad (71)$$

$$a_{oj} = [\ (S_0)^T\ (S_1)^T\ \ldots\ (S_j)^T\ ]\begin{bmatrix}v_0\\v_1\\\vdots\\v_j\end{bmatrix} \quad (72)$$

Accordingly, predictor coefficients for the third image frame can be derived as the least squared solution to the problem (expressions (70)-(72)) as formulated above, as follows:

$$m_{0j}=(B_{0j})^{-1}a_{0j} \quad (73)$$

As can be seen from the discussion herein, when the number of image frames increase, the B matrix and the a vector grow proportional to the square of the number of image frames, and thus computation complexity grows very fast. This kind of computation may need a great amount of memory and computing resources.

To reduce computing complexity and memory usage, the least squared solution may be derived under an iterative approach. In some embodiments, the B matrix and the a vector for the j-th image frame can be rearranged as follows:

$$\begin{aligned}B_{0j} &= [\ (S_0)^T\ (S_1)^T\ \ldots\ (S_j)^T\ ]\begin{bmatrix}S_0\\S_1\\\vdots\\S_j\end{bmatrix}\\&= (S_o)^T S_0 + (S_1)^T S_1 + \ldots (S_j)^T S_j\\&= \sum_{i=0}^{j}(S_i)^T S_i\\&= B_{0,j-1} + (S_j)^T S_j\end{aligned} \quad (74)$$

$$\begin{aligned}a_{0,j} &= [\ (S_0)^T\ (S_1)^T\ \ldots\ (S_j)^T\ ]\begin{bmatrix}v_0\\v_1\\\vdots\\v_j\end{bmatrix}\\&= (S_0)^T v_0 + (S_1)^T v_1 + \ldots (S_j)^T v_j\\&= \sum_{i=o}^{j}(S_i)^T v_i\\&= a_{0,j-1} + (S_j)^T v_j\end{aligned} \quad (75)$$

As can be seen, the B matrix and a vector at the j-th image frame (e.g., the current image frame j) can be calculated based at least in part on collected information of the previous image frame (image frame j−1) and image data of the j-th image frame. Accordingly, the least squared solution can be derived for successive image frames in a scene based on the B matrix and a vector using an example algorithm in the following table:

TABLE 1

```
// for frame 0
B_0 = (S_0)^T (S_0)
a_0 = (S_0)^T v_0
m_0 = (B_0)^{-1} a_0
```

TABLE 1-continued

```
// for the rest of frames still within the same scene
for(j = 1; j < F; j ++ ) {
    B_{0,j} = B_{0,j-1} + (S_j)^T S_j
    a_{0,j} = a_{0,j-1} + (S_j)^T v_j
    m_{0,j} = (B_{0,j})^{-1} a_{0,j}
}
```

12. Multi-layer Video Encoding

Figure 4A:
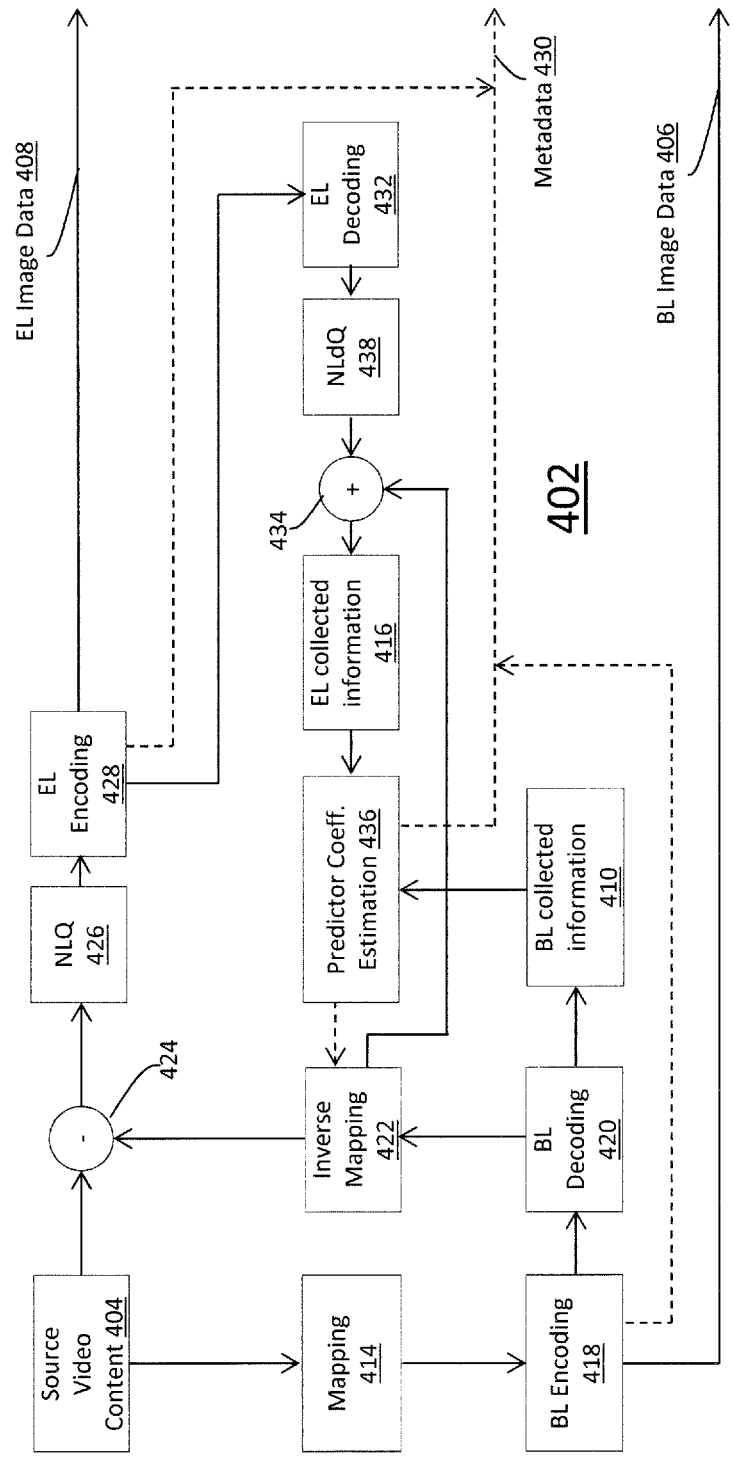
FIG. 4A and FIG. 4B illustrate example video encoder and decoder.
Figure 4B:
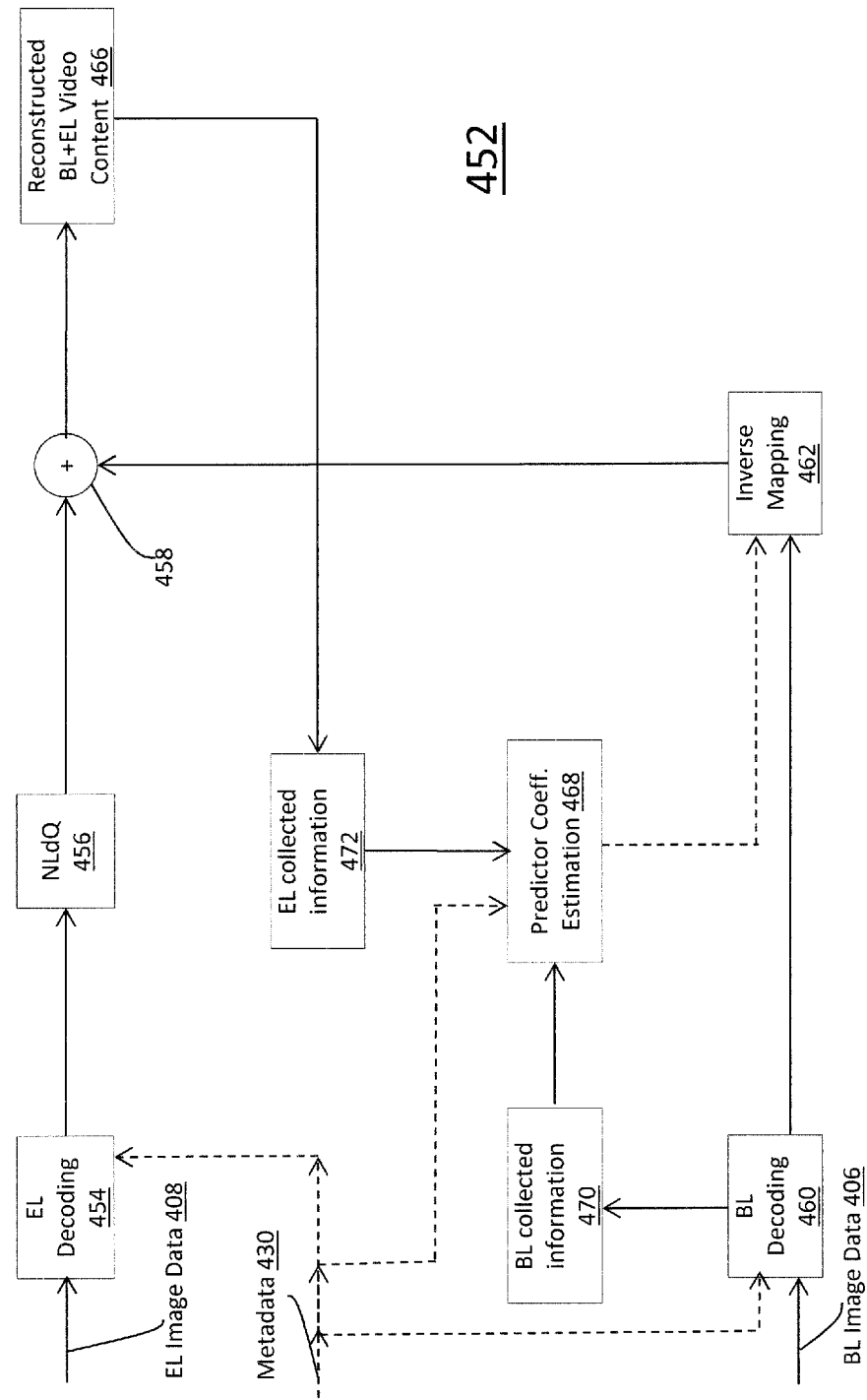

A multi-layer video signal (e.g., coded bitstream, etc.) comprising a base layer and one or more enhancement layers can be used by an upstream device (e.g., a multi-layer encoder 402 of FIG. 4A, etc.) to deliver video content encoded to downstream devices (one of which may be, for example, a multi-layer decoder 452 of FIG. 4B, etc.). In some embodiments, the video content delivered by the multiple layers comprises BL image data (e.g., 406 of FIG. 4A, FIG. 4B, etc.) of a relatively low bit depth and EL image data (e.g., 408 of FIG. 4A, FIG. 4B, etc.) complementary to the BL image data. Both the BL image data (406) and the EL image data (408) are derived/quantized from the relatively high bit depth (e.g., 12+ bit VDR, etc.) source video content (404).

In some embodiments, the BL image data (406) is placed in a base layer container (e.g., an 8-bit YCbCr 4:2:0 container, etc.). In some embodiments, the EL image data (408) comprises residual image data of the (e.g., VDR, etc.) source video content (404) relative to predicted image data generated from the BL image data (406). In some embodiments, the EL image data (408) is placed in one or more enhancement layer containers (e.g., one or more 8-bit residual data containers, etc.). The BL image data (406) and the EL image data (408) may be received and used by the downstream devices (e.g., 452 of FIG. 4B, etc.) to reconstruct a relatively high bit depth (e.g., 12+ bits, etc.) decoded version (e.g., a perceptually decoded VDR version, etc.) of the (e.g., VDR, etc.) source video content (404).

As used herein, the term "bit depth" refers to the number of bits provided in a coding space that provides available code words to encode or quantize image data; an example of low bit depth is 8 bits; an example of high bit depth is 12 bits or more. In particular, the term "a low bit depth" or "a high bit depth" does not refer to the least significant bits or the most significant bits of a code word.

In an example embodiment, the multi-layer encoder (402) is configured to receive the (e.g., VDR, etc.) source video content (404) comprising a sequence of input VDR images. The sequence of input VDR images represents one or more scenes each of which comprises a plurality input images in the sequence of VDR images. As used herein, an "input VDR image" generally refers to wide or high dynamic range image data that may be used to derive a VDR version of a source image (e.g., a scene-referred image captured by a high-end image acquisition device, a master copy from a studio system, a mezzanine version for generating video streaming packages, etc.). An input VDR image may be in any color space that supports a high dynamic range color gamut. In some embodiments, the input VDR image is the only input, relative to the source image, that provides image data for the VDR image encoder (402) to encode; input image data, relative to the source image, for base layer processing under techniques as described herein may be generated based on the input VDR image using tone mapping and/or quantization techniques.

In an example embodiment, an input VDR image decoded from the (e.g., VDR, etc.) source video content (404) is a 12+ bit YCbCr image in a YCbCr color space. In an example, each pixel represented in the input VDR image comprises code words for all channels (e.g., luminance channel Y, chroma channels Cb and Cr, etc.) defined for a color space (e.g., an YCbCr color space, etc.). Each code word comprises upsampled or downsampled code words for one or more of the channels in the color space.

In an example embodiment, the multi-layer encoder (402) is configured to transform code words of an input VDR image from a first color space (e.g., an RGB color space, etc.) to a second different color space (e.g., a YCbCr color space, etc.).

In an example embodiment, the multi-layer encoder (402) is configured to downsample or upsample an input VDR image in a first sampling format (e.g., in a 4:4:4 sampling format, etc.) to a second different sampling format (e.g., in a 4:2:0 sampling format, etc.).

In an example embodiment, the multi-layer encoder (402) is configured to perform operations related to tone mapping and/or quantization on the source video content (404) to generate the (e.g., 8-bit, etc.) BL image data (406). The operations related to tone mapping and/or quantization include but are not limited to one or more of: mapping operations (414), BL encoding operations (418), etc.

In the mapping operations (414), the multi-layer encoder (402) is configured to use a mapping function to map (e.g., 12 bit+, etc.) input VDR code words in one or more input VDR images in the (e.g., VDR, etc.) source video content (404) into mapped code words in one or more mapped images corresponding to the one or more VDR images. Mapping (414) may apply linear or non-linear high dynamic range to standard dynamic range mapping techniques as known in the art.

The number (e.g., <=256 at a bit depth of 8 bits, etc.) of available code words at the bit depth of the BL image data (406) may not be large enough to accommodate the entire numeric range of the source code words. Thus, a mapped code word in the one or more mapped images may correspond to multiple source code words.

In the BL encoding operations (418), the output of mapping (414) is compressed to be transmitted as coded BL stream 406 to a downstream decoder (e.g., 452). BL Encoding (418) may comprise any known or future video encoder, such as one described by the MPEG-2, MPEG-4, H.264, HEVC, or the like, specifications.

As depicted in FIG. 4A, in an example embodiment, the multi-layer encoder (402) is configured to perform one or more EL operations. The one or more EL operations include but are not limited to, any of: a BL decoding operation 420, a prediction or inverse mapping operation 422, a subtraction operation 424, a nonlinear quantization operator 426, an EL encoding operation 428, an EL decoding operation 432, a non-linear de-quantization operation 438, a predictor coefficient estimation operation 436, an addition operation 434, etc. In some embodiments, the predictor coefficient estimation operation (436) is configured to access BL collected information 410 (e.g., BL collected information in all processed images in a scene, BL collected information in up to a fixed number of processed images in a scene, etc.), EL collected information 416 (e.g., EL collected information in all processed images in a scene, EL collected information in up to a fixed number of processed images in a scene, etc.); generate, based at least in part on the BL collected information (410) and the EL collected information (416), parameters for prediction or inverse mapping; provide the parameters for prediction or inverse mapping to the prediction or inverse mapping operation (422); etc.

In the BL decoding operation (420), the multi-layer encoder (402) is configured to decode the (e.g., 8 bit, etc.) BL image data (406) in the (e.g., 8-bit, etc.) BL image containers back into mapped code words in one or more mapped images that correspond to the one or more input VDR images. Some or all of the decoded image data from the BL image data (406) or statistics related to the decoded image data from the BL image data (406) is stored in the BL collected information (410). In some embodiments, the BL collected information (410) may be implemented as a look back window that grows with the number of images in a scene under processing. In some embodiments, the BL collected information (410) may be implemented as a sliding window (e.g., a circular buffer, etc.) that stores up to a fixed number of images in a scene under processing.

In some embodiments, the multi-layer encoder (402) is configured to implement BL-to-EL prediction (e.g., intra and/or inter prediction, etc.) in order to reduce the amount of EL image data that needs to be carried in the EL layers for reconstructing VDR images by a downstream device (e.g., a multi-layer decoder 452 of FIG. 4B, etc.). In the prediction, or inverse mapping operation (422), the multi-layer encoder (402) is configured to inversely map the mapped (BL) code words generated by the BL decoding operation (420) into VDR code words based at least in part on the parameters for prediction or inverse mapping as generated by the predictor coefficient estimation operation (436). The multi-layer encoder (402) can generate, based at least in part on the VDR code words obtained through the prediction operation (422), prediction image data (e.g., a predicted high bit depth image, etc.).

In the subtraction operation (424), the multi-layer encoder (402) is configured to generate residual values between the VDR code words decoded from the source video content (404) and the VDR code words represented in the prediction image data. Residual values in a specific channel (e.g., a luminance channel, a Y channel, etc.) may be differences produced by the subtraction operation (424) in a logarithmic domain or in a linear domain.

In the non-linear quantization operation (426), the multi-layer encoder (402) is configured to quantize the residual values in a first digital representation (e.g., 12+ bit, etc.) to a second digital representation (e.g., 8-bit, etc.) in a color space (e.g., YCbCr, etc.) using one or more NLQ parameters.

In the EL encoding operation (428), the multi-layer encoder (402) is configured to encode or compress the (e.g., 8-bit, etc.) residual values as generated by the non-linear quantization operation, into the EL image data (408) in an (e.g., 8-bit, etc.) EL image container in a (e.g., 4:2:0, etc.) sampling format. The EL image container in the enhancement layer may be logically separate from the BL image container in the base layer, even though both image containers can be concurrently contained in a single digital video signal (e.g., a single coded bitstream, a single media file, a single broadcast, etc.).

In an example embodiment, the multi-layer encoder (402) outputs the EL image data (408) in the EL image containers as a part of multi-layer video signal to a downstream device (e.g., the multi-layer decoder 452 of FIG. 4B, etc.).

In some embodiments, the multi-layer encoder (402) outputs metadata 430 comprising some or all of operational parameters used in the operations of the multi-layer encoder (402) as a part of multi-layer video signal to a downstream device (e.g., the multi-layer decoder 452 of FIG. 4B, etc.).

In some embodiments, the metadata (430) comprises one or more of operational parameters. These operational parameters may include, but are not limited to only, any of: a selected index for a set of default parameters, some or all of a set of explicit parameters, etc. Additionally, optionally or alternatively, the operational parameters in the metadata (430) transmitted to downstream devices include but are not limited to, any of: mapping parameters, clipping parameters, inverse mapping parameters, LUTs, non-linear quantization parameters, NLQ parameters, etc. The metadata (430) may be a part of data carried in the EL layers and/or the BL layer, or in a separate sub-bitstream of an overall video bitstream, for example, as a part of supplemental enhancement information (SEI) or other similar metadata carriages available in the video bitstream. An example sub-bitstream may be a reference processing unit (RPU) stream developed by Dolby Laboratories, Inc., San Francisco, Calif.

The EL image data (408), the BL image data (406) and the metadata can be used by the downstream device to generate a decoded version of relatively wide dynamic range (e.g., VDR, HDR, etc.) images that represent the relatively wide dynamic range input images in the source video content (404).

In the EL decoding operation (432), the multi-layer encoder (402) is configured to generate (e.g., 8-bit, etc.) residual values by decoding the EL image data (408), which may be in an (e.g., 8-bit, etc.) EL image container in a (e.g., 4:2:0, etc.) sampling format.

In the non-linear de-quantization operation (438), the multi-layer encoder (402) is configured to de-quantize the residual values in a relatively low bit depth digital representation (e.g., 8-bit, etc.) as decoded to a relatively high bit depth digital representation (e.g., 12+ bit, etc.) in a (e.g., YCbCr, etc.) color space using one or more NLQ parameters decoded from the metadata (430).

In some embodiments, in the addition operation (434), the multi-layer encoder (402) is configured to generate the reconstructed version of one or more wide dynamic range images based on the de-quantized residual values generated in the non-linear de-quantization operation (438) and the VDR code words generated in the inverse mapping operation (422).

In some embodiments, some or all of image data from the reconstructed version of the one or more wide dynamic range images or statistics related to the reconstructed version of the one or more wide dynamic range images is stored in the EL collected information (416). In some embodiments, the EL collected information (416) may be implemented as a look back window that grows with the number of images in a scene under processing. In some embodiments, the EL collected information (416) may be implemented as a sliding window (e.g., a circular buffer, etc.) that stores up to a fixed number of images in a scene under processing.

In some embodiments, in the addition operation (434), the multi-layer encoder (402) is configured to generate the reconstructed version of one or more wide dynamic range image partitions based on the de-quantized residual values generated in the non-linear de-quantization operation (438) and the VDR code words generated in the inverse mapping operation (422).

In some embodiments, some or all of image data from the reconstructed version of the one or more wide dynamic range image partitions or statistics related to the reconstructed version of the one or more wide dynamic range images is stored in the EL collected information (416). In some embodiments, the EL collected information (416) may be implemented as a look back window that grows with the number of image partitions in an image under processing. In some embodiments, the EL collected information (416) may be implemented as a sliding window (e.g., a circular buffer, etc.) that stores up to a fixed number of image partitions in an image under processing.

One or more of the operations such as the BL encoding operation (418), the BL decoding operation (420), the EL encoding operation (428), etc., may be implemented using one or more of a plurality of codecs, including, but not limited to, any combination of: H.264/AVC/HEVC, MPEG-2, VP8, VC-1, and/or others.

13. Multi-Layer Video Decoding

A multi-layer video signal (e.g., coded bitstream, etc.) comprising video content can be received by a multi-layer decoder (e.g., 452 of FIG. 4B, etc.). In some embodiments, the video content received by the multi-layer decoder (452) comprises BL image data (e.g., 406 of FIG. 4A, FIG. 4B, etc.) of a relatively low bit depth and EL image data (e.g., 408 of FIG. 4A and FIG. 4B, etc.). In some embodiments, both the BL image data (406) and the EL image data (408) were derived/quantized from the relatively high bit depth (e.g., 12+ bit VDR, etc.) source video content (e.g., 404 of FIG. 4A, etc.). In some embodiments, the multi-layer decoder (452) is configured to receive metadata (430) comprising some or all of operational parameters used in operations that generate the BL image data (406) and the EL image data (408) as a part of the multi-layer video signal. These operational parameters may include, but are not limited to only, any of: a selected index for a set of default parameters, some or all of a set of explicit parameters, etc. Additionally, optionally or alternatively, the operational parameters in the metadata (430) transmitted to downstream devices include but are not limited to, any of: mapping parameters, clipping parameters, inverse mapping parameters, LUTs, non-linear quantization parameters, NLQ parameters, etc. The metadata (430) may be a part of data carried in the EL layers and/or the BL layer, or in a separate sub-bitstream of an overall video bitstream, for example, as a part of supplemental enhancement information (SEI) or other similar metadata carriages available in the video bitstream. An example sub-bitstream may be a reference processing unit (RPU) stream developed by Dolby Laboratories, Inc., San Francisco, Calif.

In some embodiments, the BL image data (406) is placed in a base layer container (e.g., an 8-bit YCbCr 4:2:0 container, etc.). In some embodiments, the EL image data (408) comprises residual image data of the (e.g., VDR, etc.) source video content (404) relative to predicted image data generated from the BL image data (406). In some embodiments, the EL image data (408) is placed in one or more enhancement layer containers (e.g., one or more 8-bit residual data containers, etc.).

In an example embodiment, the multi-layer decoder (452) is configured to perform decoding operations on the BL image data (406) and the EL image data (408) to generate one or more wide dynamic range (e.g., VDR, etc.) images that represents a reconstructed version (e.g., reconstructed BL+EL video content 466, etc.) of source images in source video content that was used to generate the multi-layer video signal. The decoding operations include but are not limited to one or more of: a BL decoding operation 460, an inverse mapping operation 462, an EL decoding operation 454, a non-linear de-quantization operation 456, an addition operation 458, a predictor coefficient estimation operation 468, etc. In some embodiments, the predictor coefficient estimation operation (468) is configured to access BL collected information 470 (e.g., BL collected information in all processed images in a scene, BL collected information in up to a fixed number of processed images in a scene, etc.), EL collected information 472 (e.g., EL collected information in all processed images in a scene, EL collected information in up to a fixed number of processed images in a scene, etc.), etc.; generate, based at least in part on the BL collected information (470) and the EL collected information (472), parameters for prediction or inverse mapping; provide the parameters for prediction or inverse mapping to the prediction or inverse mapping operation (462); etc.

In the BL decoding operation (460), the multi-layer decoder (452) is configured to decode the (e.g., 8 bit, etc.) BL image data (406) in the (e.g., 8-bit, etc.) BL image containers into mapped code words in one or more mapped images (e.g., tone-mapped images). Some or all of the decoded image data from the BL image data (406) or statistics related to the decoded image data from the BL image data (406) is stored in the BL collected information (470). In some embodiments, the BL collected information (470) may be implemented as a look back window that grows with the number of images in a scene under processing. In some embodiments, the BL collected information (470) may be implemented as a sliding window (e.g., a circular buffer, etc.) that stores up to a fixed number of images in a scene under processing.

In the inverse mapping operation (462), the multi-layer decoder (452) is configured to inversely map the mapped code words into VDR code words.

In the EL decoding operation (454), the multi-layer decoder (452) is configured to generate (e.g., 8-bit, etc.) residual values by decoding the EL image data (408), which may be in an (e.g., 8-bit, etc.) EL image container in a (e.g., 4:2:0, etc.) sampling format.

In the non-linear de-quantization operation (456), the multi-layer decoder (452) is configured to de-quantize the residual values in a relatively low bit depth digital representation (e.g., 8-bit, etc.) as decoded to a relatively high bit depth digital representation (e.g., 12+ bit, etc.) in a (e.g., YCbCr, etc.) color space using one or more NLQ parameters decoded from the metadata (430).

In some embodiments, the multi-layer decoder (452) is configured to implement BL-to-EL prediction (e.g., intra and/or inter prediction, etc.) in order to reduce the amount of EL image data that needs to be carried in the EL layers for reconstructing VDR images by the multi-layer decoder (452). The multi-layer decoder (452) can generate, based at least in part on the VDR code words obtained through the prediction operation (422), prediction image data (e.g., a predicted high bit depth image, etc.).

In some embodiments, in the addition operation (458), the multi-layer decoder (452) is configured to generate the reconstructed version of one or more wide dynamic range images based on the de-quantized residual values generated in the non-linear de-quantization operation (456) and the VDR code words generated in the inverse mapping operation (462). The reconstructed version of the one or more wide dynamic range images can be outputted to and/or rendered on a display panel, for example, by a (e.g., HDR, VDR, etc.) display system that operates with or includes the multi-layer decoder (452). Some or all of image data from the reconstructed version of the one or more wide dynamic range images or statistics related to the reconstructed version of the one or more wide dynamic range images is stored in the EL collected information (472). In some embodiments, the EL collected information (472) may be implemented as a look back window that grows with the number of images in a scene under processing. In some embodiments, the EL collected information (472) may be implemented as a sliding window (e.g., a circular buffer, etc.) that stores up to a fixed number of images in a scene under processing.

In some embodiments, in the addition operation (458), the multi-layer decoder (452) is configured to generate the reconstructed version of one or more wide dynamic range image partitions based on the de-quantized residual values generated in the non-linear de-quantization operation (456) and the VDR code words generated in the inverse mapping operation (462). Some or all of image data from the reconstructed version of the one or more wide dynamic range image partitions or statistics related to the reconstructed version of the one or more wide dynamic range image partitions is stored in the EL collected information (472). In some embodiments, the EL collected information (472) may be implemented as a look back window that grows with the number of image partitions in an image under processing. In some embodiments, the EL collected information (472) may be implemented as a sliding window (e.g., a circular buffer, etc.) that stores up to a fixed number of image partitions in an image under processing.

In some embodiments, components or modules used in the inverse mapping (462) or the BL decoding operation (460) of the multi-layer decoder (452) may be the same or substantially the same as those used in the inverse mapping (420) or the BL decoding operation (418) of the multi-layer encoder (402).

One or more of the operations performed by the multi-layer decoder (452) may be implemented using one or more of a plurality of codecs, including, but not limited to, any combination of: H.264/AVC/HEVC, MPEG-2, VP8, VC-1, and/or others.

Figure 7A:
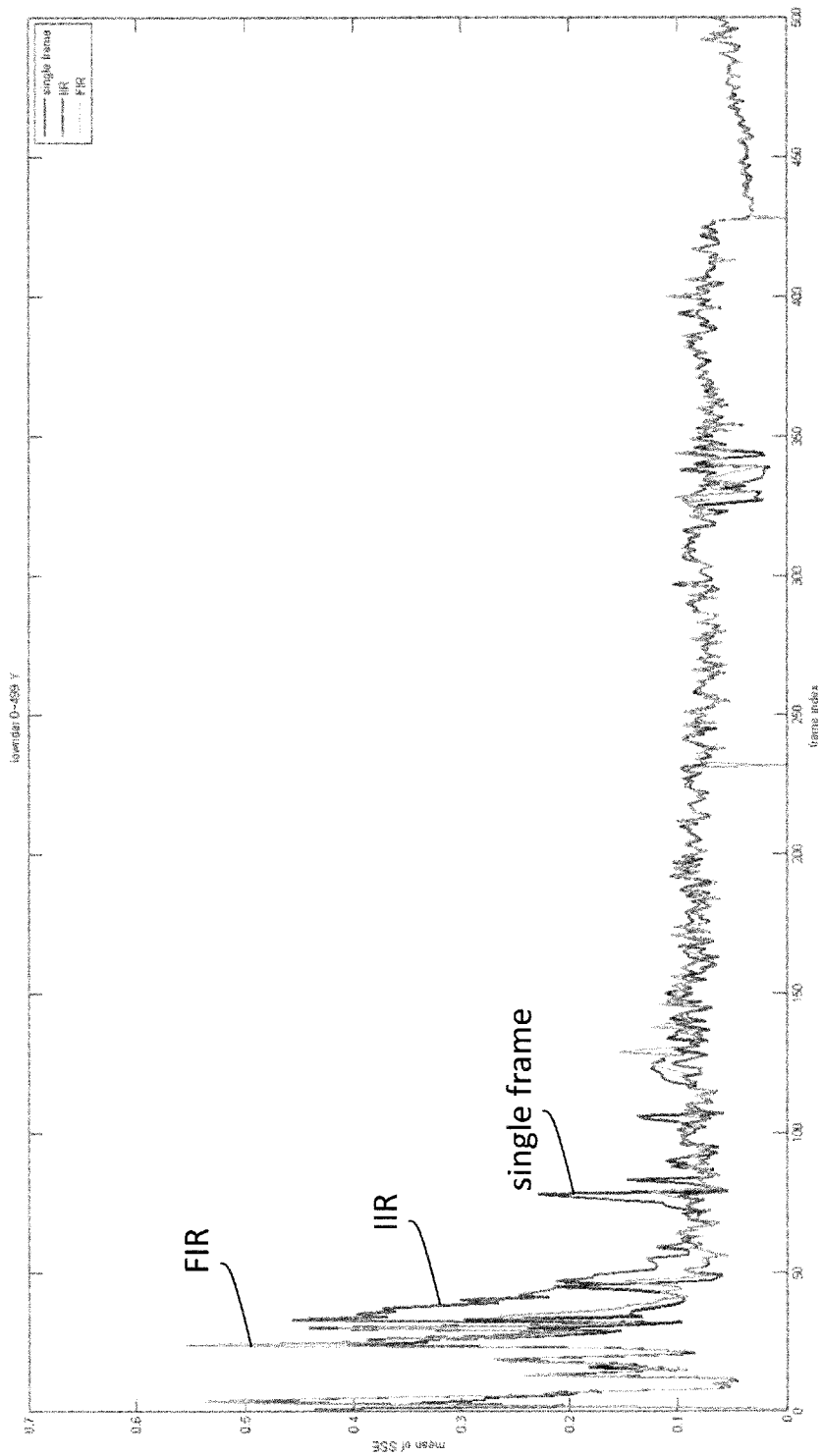
FIG. 7A and FIG. 7B illustrate example comparisons among sums of squares for error (SSE) with or without self-adaptive prediction operations.

FIG. 7A illustrates an example comparison among sums of squares for error (SSE) with or without self-adaptive prediction operations performed at a frame level. A first set of SSE values (denoted as "single frame") is generated without self-adaptive prediction for a sequence of images in a scene with an individual set of prediction parameters for each image in the sequence of images. A second set of SSE values (denoted as "IIR") is generated by self-adaptive prediction for the same sequence of images with a set of prediction parameters generated based on collected information in a growing look back window. A third set of SSE values (denoted as "FIR") is generated by self-adaptive prediction for the same sequence of images with a set of prediction parameters generated based on collected information in a sliding window. While the total volume of metadata used to carry prediction parameters without self-adaptive prediction is significantly reduced by self-adaptive prediction as described herein, the SSE values of the images are similar with or without self-adaptive prediction.

Figure 7B:
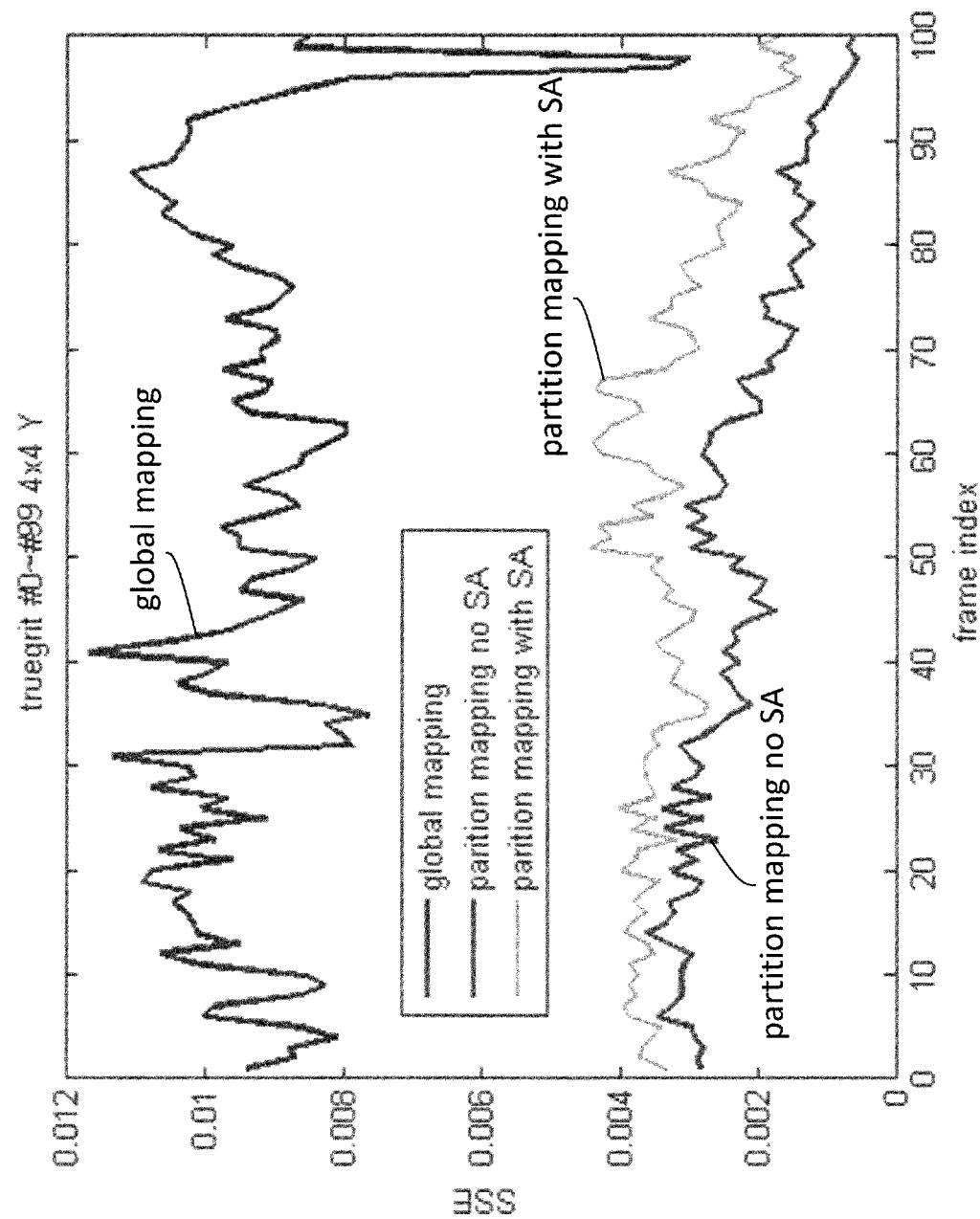

FIG. 7B illustrates an example comparison among sums of squares for error (SSE) with or without self-adaptive prediction operations performed at a partition level. A fourth set of SSE values (denoted as "global mapping") is generated without self-adaptive prediction for an entire image with a single set of prediction parameters global to all partitions of the image. A fifth set of SSE values (denoted as "partition mapping no SA") is generated without self-adaptive prediction for a plurality of image partitions in the image with an individual set of prediction parameters for each image partition in the plurality of image partitions. A sixth set of SSE values (denoted as "partition mapping with SA") is generated by self-adaptive prediction for the same plurality of image partitions with a set of prediction parameters generated based on collected information in a sliding window or a look back window. While the total volume of metadata used to carry prediction parameters without self-adaptive prediction corresponding to the fifth set of SSE values (denoted as "partition mapping no SA") is significantly reduced by the self-adaptive prediction corresponding to the sixth set of SSE values (denoted as "partition mapping with SA"), the SSE values of the images are similar. Furthermore, the self-adaptive prediction corresponding to the sixth set of SSE values (denoted as "partition mapping with SA"), the SSE values of the images generates significantly lower error values than the non-self-adaptive prediction corresponding to the fourth set of SSE values (denoted as "global mapping"). This shows that techniques as described herein can be applied to reduce the total volume of metadata for carrying prediction parameters as well as reduce EL image data as the errors generated by self-adaptive prediction are comparatively small.

For the purpose of illustration only, it has been described that self-adaptive prediction can be performed at a frame level in a temporal domain as well as at a partition level in a spatial domain. In other embodiments, self-adaptive prediction as described herein can be performed under a hybrid approach that has a combination of operations performed at a frame level in a temporal domain as well as at a partition level in a spatial domain.

14. Example Process Flows

FIG. 5A illustrates an example process flow according to an example embodiment of the present invention. In some example embodiments, one or more computing devices or components may perform this process flow. In block 502, a multi-layer video codec (e.g., 402 of FIG. 4A, 452 of FIG. 4B, etc.) converts one or more relatively low dynamic range images (e.g., 100 nits, 1000 nits, 2000 nits, etc.) into one or more relatively high dynamic range images (e.g., 600 nits, 1000 nits, 2000 nits, 10000 nits, 20000 or more nits, etc.), each image in the one or more relatively high dynamic range images comprising reconstructed pixel values that have a higher dynamic range than pixel values of a corresponding image in the one or more relatively low dynamic range images.

In block 504, the multi-layer video codec collects information relating to reconstructed pixel values of each image in the one or more relatively high dynamic range images and pixel values of a corresponding image in the one or more relatively low dynamic range images.

In block 506, the multi-layer video codec derives, from the collected information, one or more prediction parameters for a relatively low dynamic range image that is subsequent to the one or more relatively high dynamic range images.

In block 508, the multi-layer video codec generates a predicted image from the relatively low dynamic range image based on the one or more prediction parameters derived from the collected information, the predicted image comprising predicted pixel values that have the higher dynamic range than pixel values of the relatively low dynamic range image.

In an embodiment, the relatively low dynamic range image and the one or more relatively low dynamic range images are in a group of relatively low dynamic range images representing a scene.

In an embodiment, the one or more relatively low dynamic range images comprise an initial relatively low dynamic range image in a group of relatively low dynamic range images representing a scene; the multi-layer video codec is further configured to generate an initial predicted image from the initial relatively low dynamic range image based on one or more default prediction parameters, the initial predicted image comprising initial predicted pixel values that have the higher dynamic range than initial pixel values of the initial relatively low dynamic range image; etc.

In an embodiment, the one or more relatively low dynamic range images comprise an initial relatively low dynamic range image in a group of relatively low dynamic range images representing a scene; the multi-layer video codec is further configured to perform: selecting a set of default prediction parameters from one or more sets of default prediction parameters; generating an initial predicted image from the initial relatively low dynamic range image based on the selected set of default prediction parameters, the initial predicted image comprising initial predicted pixel values that have the higher dynamic range than initial pixel values of the initial relatively low dynamic range image; etc.

In an embodiment, the one or more relatively low dynamic range images comprise an initial relatively low dynamic range image in a group of relatively low dynamic range images representing a scene; the multi-layer video codec is further configured to perform: determining non-default prediction parameters for the initial relatively low dynamic range image; generating an initial predicted image from the initial relatively low dynamic range image based on the non-default prediction parameters, the initial predicted image comprising initial predicted pixel values that have the higher dynamic range than initial pixel values of the initial relatively low dynamic range image.

In an embodiment, the multi-layer video codec is further configured to perform: decompressing a portion of enhancement layer (EL) image data in a multi-layer video signal into residual pixel values; combining the residual pixel values with the predicted pixel values of the predicted image to generate a reconstructed relatively high dynamic range image, the reconstructed image comprising reconstructed pixel values that have the higher dynamic range than pixel values of the relatively low dynamic range image; collecting information relating to the reconstructed pixel values of the reconstructed relatively high dynamic range image and the pixel values of the relatively low dynamic range image; etc.

In an embodiment, the collected information is stored in a look back window that stores information relating to (a) all reconstructed relatively high dynamic range images in a scene preceding to a reconstructed relatively high dynamic range image converted from the relatively low dynamic range image and (b) all relatively low dynamic range images in the scene preceding to the relatively low dynamic range image.

In an embodiment, the collected information is stored in a sliding window that stores information relating to (a) up to a fixed number of reconstructed relatively high dynamic range images in a scene most recently preceding to a reconstructed relatively high dynamic range image converted from the relatively low dynamic range image and (b) up to the fixed number of relatively low dynamic range images in the scene most recently preceding to the relatively low dynamic range image.

In an embodiment, the collected information comprises reconstructed pixel values of at least one of the one or more relatively high dynamic range images and pixel values of at least one of the one or more relatively low dynamic range images.

In an embodiment, the collected information comprises one or more of statistics computed from reconstructed pixel values of at least one of the one or more relatively high dynamic range images, or statistics computed from pixel values of at least one of the one or more relatively low dynamic range images.

In an embodiment, the collected information comprises one or more previous prediction parameters that were used to inversely map at least one of the one or more relatively low dynamic range images to at least one predicted relatively high dynamic range image.

In an embodiment, the collected information comprises one or more of: average values, maximum values, minimum values, medium values, or other group values, that are computed for at least one partition in a three-dimensional cube of a color space.

In an embodiment, the relatively low dynamic range image and the one or more relatively low dynamic range images are a part of base-layer (BL) image data in a multi-layer video signal.

In an embodiment, the relatively low dynamic range image and the one or more relatively low dynamic range images are a part of base-layer (BL) image data in a multi-layer video signal.

In an embodiment, neither the collected information nor the one or more prediction parameters for the relatively low dynamic range image are provided as metadata in a multi-layer video signal that comprises the relatively low dynamic range image and the one or more relatively low dynamic range images are a part of base-layer (BL) image data in the multi-layer video signal.

In an embodiment, the relatively low dynamic range image comprises pixel values in one or more of a luminance channel, a chroma channel, a red color channel, a blue color channel, a green color channel, or other primary channels.

In an embodiment, the one or more relatively low dynamic range images are ordered in one of a decoding order in which the one or more relatively low dynamic range images are decoded from a multi-layer video signal, a displaying order in which the one or more relatively low dynamic range images are to be rendered, or an order other than the decoding order and the displaying order.

FIG. 5B illustrates an example process flow according to an example embodiment of the present invention. In some example embodiments, one or more computing devices or components may perform this process flow. In block 522, a multi-layer video codec (e.g., 402 of FIG. 4A, 452 of FIG. 4B, etc.) converts one or more relatively low dynamic range image partitions into one or more relatively high dynamic range image partitions, each image partition in the one or more relatively high dynamic range image partitions comprising reconstructed pixel values that have a higher dynamic range than pixel values of a corresponding image partition in the one or more relatively low dynamic range image partitions.

In block 524, the multi-layer video codec collects information relating to reconstructed pixel values of each image partition in the one or more relatively high dynamic range image partitions and pixel values of a corresponding image partition in the one or more relatively low dynamic range image partitions.

In block 526, the multi-layer video codec derives, from the collected information, one or more prediction parameters for a relatively low dynamic range image partition that neighbors the one or more relatively high dynamic range image partitions.

In block 528, the multi-layer video codec generates a predicted image partition from the relatively low dynamic range image partition based on the one or more prediction parameters derived from the collected information, the predicted image partition comprising predicted pixel values that have the higher dynamic range than pixel values of the relatively low dynamic range image partition.

In an embodiment, the relatively low dynamic range image partition and the one or more relatively low dynamic range image partitions are within a relatively low dynamic range image.

In an embodiment, the one or more relatively low dynamic range image partitions comprise an initial relatively low dynamic range image partition in a relatively low dynamic range image; the multi-layer video codec is further configured to generate an initial predicted image partition from the initial relatively low dynamic range image partition based on one or more default prediction parameters, the initial predicted image partition comprising initial predicted pixel values that have the higher dynamic range than initial pixel values of the initial relatively low dynamic range image partition; etc.

In an embodiment, the one or more relatively low dynamic range image partitions comprise an initial relatively low dynamic range image partition in a relatively low dynamic range image; the multi-layer video codec is further configured to perform: selecting a set of default prediction parameters from one or more sets of default prediction parameters; generating an initial predicted image partition from the initial relatively low dynamic range image partition based on the selected set of default prediction parameters, the initial predicted image partition comprising initial predicted pixel values that have the higher dynamic range than initial pixel values of the initial relatively low dynamic range image partition; etc.

In an embodiment, the one or more relatively low dynamic range image partitions comprise an initial relatively low dynamic range image in a relatively low dynamic range image; the multi-layer video codec is further configured to perform: determining non-default prediction parameters for the initial relatively low dynamic range image partition; generating an initial predicted image partition from the initial relatively low dynamic range image partition based on the non-default prediction parameters, the initial predicted image partition comprising initial predicted pixel values that have the higher dynamic range than initial pixel values of the initial relatively low dynamic range image partition; etc.

In an embodiment, the multi-layer video codec is further configured to perform: decompressing a portion of enhancement layer (EL) image data in a multi-layer video signal into residual pixel values; combining the residual pixel values with the predicted pixel values of the predicted image partition to generate a reconstructed relatively high dynamic range image partition, the reconstructed relatively high dynamic range image partition comprising reconstructed pixel values that have the higher dynamic range than pixel values of the relatively low dynamic range image partition; collecting information relating to the reconstructed pixel values of the reconstructed relatively high dynamic range image partition and the pixel values of the relatively low dynamic range image partition; etc.

In an embodiment, the collected information is stored in a look back window that stores information relating to (a) all reconstructed relatively high dynamic range image partitions in a reconstructed relatively high dynamic range image preceding to a reconstructed relatively high dynamic range image partition converted from the relatively low dynamic range image partition and (b) all relatively low dynamic range image partitions in a relatively low dynamic range image preceding to the relatively low dynamic range image partition.

In an embodiment, the collected information is stored in a sliding window that stores information relating to (a) up to a fixed number of reconstructed relatively high dynamic range image partitions in a reconstructed relatively high dynamic range image most recently preceding to a reconstructed relatively high dynamic range image partition converted from the relatively low dynamic range image partition and (b) up to the fixed number of relatively low dynamic range image partitions in a relatively low dynamic range image most recently preceding to the relatively low dynamic range image partition.

In an embodiment, the collected information comprises reconstructed pixel values of at least one of the one or more relatively high dynamic range image partitions and pixel values of at least one of the one or more relatively low dynamic range image partitions.

In an embodiment, the collected information comprises one or more of statistics computed from reconstructed pixel values of at least one of the one or more relatively high dynamic range image partitions, or statistics computed from pixel values of at least one of the one or more relatively low dynamic range image partitions.

In an embodiment, the collected information comprises one or more previous prediction parameters that were used to inversely map at least one of the one or more relatively low dynamic range image partitions to at least one predicted relatively high dynamic range image partition.

In an embodiment, the relatively low dynamic range image partition and the one or more relatively low dynamic range image partitions are a part of base-layer (BL) image data in a multi-layer video signal.

In an embodiment, the relatively low dynamic range image partition and the one or more relatively low dynamic range image partitions are a part of base-layer (BL) image data in a multi-layer video signal.

In an embodiment, neither the collected information nor the one or more prediction parameters for the relatively low dynamic range image partition are provided as metadata in a multi-layer video signal that comprises the relatively low dynamic range image partition and the one or more relatively low dynamic range image partitions are a part of base-layer (BL) image data in the multi-layer video signal.

In an embodiment, the relatively low dynamic range image partition comprises pixel values in one or more of: a luminance channel, a chroma channel, a red color channel, a blue color channel, a green color channel, or other primary channels.

In an embodiment, the one or more relatively low dynamic range image partitions represent one or more of a top neighboring partition, a left neighboring partition, a top-left neighboring partition, or a top-right neighboring partition, in a relatively low dynamic range image with respect to the relatively low dynamic range image partition.

In various example embodiments, an encoder, a decoder, a transcoder, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

15. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
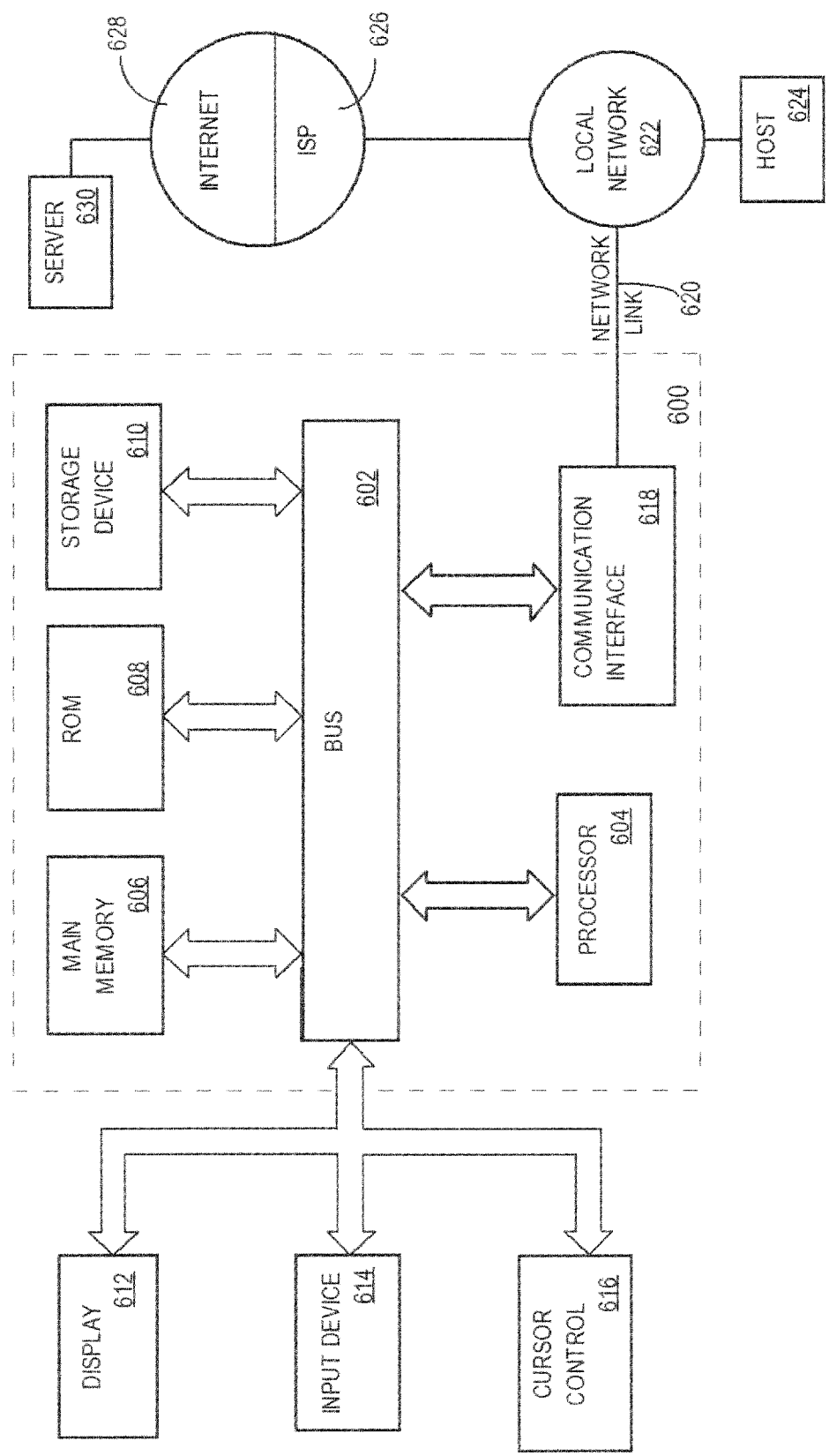
FIG. 6 illustrates an example hardware platform on which a computer or a computing device as described herein may be implemented.

For example, FIG. 6 is a block diagram that illustrates a computer system 600 upon which an example embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604.

A storage device 610, such as a magnetic disk or optical disk, is provided and coupled to bus 602 for storing information and instructions.

Computer system 600 may be coupled via bus 602 to a display 612, such as a liquid crystal display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

16. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method, comprising:

generating, by a video decoder based on a number of previously decoded relatively low dynamic range images and the same number of previously decoded relatively high dynamic range residual images, the same number of previously reconstructed relatively high dynamic range images, wherein the number is one or more, wherein each image in the previously reconstructed relatively high dynamic range images is generated based on a respective corresponding image in the previously decoded relatively low dynamic range images and a respective corresponding image in the previously decoded relatively high dynamic range residual images, and wherein each image in the previously reconstructed relatively high dynamic range images comprises reconstructed pixel values that have a higher dynamic range than pixel values of the respective corresponding image in the previously decoded relatively low dynamic range images;

collecting, by the video decoder, previous image statistic information relating to reconstructed pixel values of each image in the previously reconstructed relatively high dynamic range images and pixel values of the respective corresponding image in the previously decoded relatively low dynamic range images, wherein the collected previous image statistic information includes high dynamic range statistics of the reconstructed pixel values of each image in the one or more relatively high dynamic range images;

deriving, by the video decoder from the collected previous image statistic information including the high dynamic range statistics of the reconstructed pixel values of each image in the previously reconstructed relatively high dynamic range images, one or more current prediction parameters for a currently decoded relatively low dynamic range image that is decoded subsequent to the previously decoded relatively low dynamic range images;

generating, by the video decoder, a currently predicted image from the currently decoded relatively low dynamic range image based on the one or more current prediction parameters derived from the collected previous image statistic information, the currently predicted image comprising currently predicted pixel values that have a higher dynamic range than currently decoded pixel values of the currently decoded relatively low dynamic range image and that are predicted from the currently decoded pixel values of the currently decoded relatively low dynamic range image;

decompressing, by the video decoder, a portion of enhancement layer (EL) image data in a multi-layer video signal into currently decoded residual pixel values; and combining, by the video decoder, the currently decoded residual pixel values with the currently predicted pixel values of the currently predicted image to generate a currently reconstructed relatively high dynamic range image, the currently reconstructed image comprising currently reconstructed pixel values that have the higher dynamic range than the currently decoded pixel values of the currently decoded relatively low dynamic range image.

2. The method of claim 1, further comprising:

generating, based on one or more relatively low dynamic range image partitions of a specific image in the previously decoded relatively low dynamic range images and relatively high dynamic range residual image partition of a specific residual image in the previously decoded residual image, one or more relatively high dynamic range image partitions of a specific reconstructed image in the previously reconstructed relatively high dynamic range images;

collecting partition-based information relating to reconstructed pixel values of each image partition in the one or more relatively high dynamic range image partitions of the specific reconstructed image and pixel values of a corresponding image partition in the one or more relatively low dynamic range image partitions of the specific image;

deriving, from the collected partition-based information, one or more partition-based prediction parameters for a second image, wherein the second image is among the previously decoded relatively low dynamic range images and is subsequent in time to the specific image in the previously decoded relatively low dynamic range images; and generating a specific predicted image from the second image based on the one or more partition-based prediction parameters derived from the collected partition-based information.

3. The method as recited in claim 1, wherein the currently decoded relatively low dynamic range image and the previously decoded one or more relatively low dynamic range images are in a group of relatively low dynamic range images representing a scene of video.

4. The method as recited in claim 1, wherein the previously decoded relatively low dynamic range images comprise an initial relatively low dynamic range image in a group of relatively low dynamic range images representing a scene of video; further comprising generating an initial predicted image from the initial relatively low dynamic range image based on one or more default prediction parameters, the initial predicted image comprising initial predicted pixel values that have the higher dynamic range than initial pixel values of the initial relatively low dynamic range image, wherein the default prediction parameters are predefined prediction parameters.

5. The method as recited in claim 1, wherein the previously decoded relatively low dynamic range images comprise an initial relatively low dynamic range image in a group of relatively low dynamic range images representing a scene of video; further comprising:

selecting a set of default prediction parameters from one or more sets of default prediction parameters; and generating an initial predicted image from the initial relatively low dynamic range image based on the selected set of default prediction parameters, the initial predicted image comprising initial predicted pixel values that have the higher dynamic range than initial pixel values of the initial relatively low dynamic range image, wherein the default prediction parameters are predefined prediction parameters.

6. The method as recited in claim 1, wherein the previously decoded relatively low dynamic range images comprise an initial relatively low dynamic range image in a group of relatively low dynamic range images representing a scene of video; further comprising:

determining non-default prediction parameters for the initial relatively low dynamic range image;

generating an initial predicted image from the initial relatively low dynamic range image based on the non-default prediction parameters, the initial predicted image comprising initial predicted pixel values that have the higher dynamic range than initial pixel values of the initial relatively low dynamic range image.

7. The method as recited in claim 1, further comprising:

collecting information relating to the currently reconstructed pixel values of the currently reconstructed relatively high dynamic range image and the pixel values of the currently decoded relatively low dynamic range image.

8. The method as recited in claim 1, wherein the collected previous image statistic information is stored in a look back window that stores information relating to (a) all reconstructed relatively high dynamic range images in a scene of video preceding the currently reconstructed relatively high dynamic range image converted from the currently decoded relatively low dynamic range image and (b) all relatively low dynamic range images in the scene of video preceding the currently decoded relatively low dynamic range image.

9. The method as recited in claim 1, wherein the collected previous image statistic information is stored in a sliding window that stores information relating to (a) up to a fixed number of reconstructed relatively high dynamic range images in a scene of video most recently preceding the currently reconstructed relatively high dynamic range image converted from the currently decoded relatively low dynamic range image and (b) up to the fixed number of relatively low dynamic range images in the scene of video most recently preceding the currently decoded relatively low dynamic range image.

10. The method as recited in claim 1, wherein the currently decoded relatively low dynamic range image and the previously decoded relatively low dynamic range images are a part of base-layer (BL) image data in a multi-layer video signal.

11. The method as recited in claim 1, wherein neither the collected previous image statistic information nor the one or more prediction parameters for the currently decoded relatively low dynamic range image are provided as metadata in a multi-layer video signal that comprises the currently decoded relatively low dynamic range image and the previously decoded relatively low dynamic range images are a part of base-layer (BL) image data in the multi-layer video signal.

12. The method as recited in claim 1, wherein the currently decoded relatively low dynamic range image comprises pixel values in one or more of a luminance channel, a chroma channel, a red color channel, a blue color channel, a green color channel, or other primary channels.

13. A method, comprising:
generating, by a video decoder based on a number of previously decoded relatively low dynamic range image partitions and the same number of previously decoded relatively high dynamic range residual image partitions, the same number of previously reconstructed relatively high dynamic range image partitions, wherein the number is one or more, wherein each image partition in the previously reconstructed relatively high dynamic range image partitions is generated based on a respective corresponding image partition in the previously decoded relatively low dynamic range image partitions and a respective corresponding image partition in the previously decoded relatively high dynamic range residual image partitions, and wherein each image partition in the previously reconstructed relatively high dynamic range image partitions comprises reconstructed pixel values that have a higher dynamic range than pixel values of the respective corresponding image partition in the previously decoded relatively low dynamic range image partitions;
collecting, by the video decoder, previous image partition statistic information relating to reconstructed pixel values of each image partition in the previously reconstructed relatively high dynamic range image partitions and pixel values of the respective corresponding image partition in the previously decoded relatively low dynamic range image partitions, wherein the collected previous image partition statistic information includes high dynamic range statistics of the reconstructed pixel values of each image in the previously reconstructed relatively high dynamic range images;
deriving, by the video decoder from the collected previous image partition statistic information including the high dynamic range statistics of the reconstructed pixel values of each image in the previously reconstructed relatively high dynamic range images, one or more prediction parameters for a currently decoded relatively low dynamic range image partition that neighbors with the previously decoded relatively high dynamic range image partitions;
generating, by the video decoder, a currently predicted image partition from the currently decoded relatively low dynamic range image partition based on the one or more prediction parameters derived from the collected previous image partition statistic information, the currently predicted image partition comprising predicted pixel values that have the higher dynamic range than pixel values of the currently decoded relatively low dynamic range image partition and that are predicted from the currently decoded pixel values of the currently decoded relatively low dynamic range image partition;
decompressing, by the video decoder, a portion of enhancement layer (EL) image data in a multi-layer video signal into currently decoded residual pixel values; and
combining, by the video decoder, the currently decoded residual pixel values with the currently predicted pixel values of the currently predicted image partition to generate a currently reconstructed relatively high dynamic range image partition, the currently reconstructed relatively high dynamic range image partition comprising currently reconstructed pixel values that have the higher dynamic range than the currently decoded pixel values of the currently decoded relatively low dynamic range image partition.

14. The method as recited in claim 13, wherein the currently decoded relatively low dynamic range image partition and the previously decoded relatively low dynamic range image partitions are within a relatively low dynamic range image.

15. The method as recited in claim 13, wherein the previously decoded relatively low dynamic range image partitions comprise an initial relatively low dynamic range image partition in a relatively low dynamic range image; further comprising generating an initial predicted image partition from the initial relatively low dynamic range image partition based on one or more default prediction parameters, the initial predicted image partition comprising initial predicted pixel values that have the higher dynamic range than initial pixel values of the initial relatively low dynamic range image partition, wherein the default prediction parameters are predefined prediction parameters.

16. The method as recited in claim 13, wherein the previously decoded relatively low dynamic range image partitions comprise an initial relatively low dynamic range image partition in a relatively low dynamic range image; further comprising:
selecting a set of default prediction parameters from one or more sets of default prediction parameters; and
generating an initial predicted image partition from the initial relatively low dynamic range image partition based on the selected set of default prediction parameters, the initial predicted image partition comprising initial predicted pixel values that have the higher dynamic range than initial pixel values of the initial relatively low dynamic range image partition,
wherein the default prediction parameters are predefined prediction parameters.

17. The method as recited in claim 13, wherein the previously decoded relatively low dynamic range image partitions comprise an initial relatively low dynamic range image in a relatively low dynamic range image; further comprising:
determining non-default prediction parameters for the initial relatively low dynamic range image partition;
generating an initial predicted image partition from the initial relatively low dynamic range image partition based on the non-default prediction parameters, the initial predicted image partition comprising initial predicted pixel values that have the higher dynamic range than initial pixel values of the initial relatively low dynamic range image partition.

18. The method as recited in claim 13, further comprising:
collecting information relating to the reconstructed pixel values of the currently reconstructed relatively high dynamic range image partition and the pixel values of the currently decoded relatively low dynamic range image partition.

19. The method as recited in claim 13, wherein the collected previous image partition statistic information is stored in a look back window that stores information relating to (a) all reconstructed relatively high dynamic range image partitions in a reconstructed relatively high dynamic range image preceding to the currently reconstructed relatively high dynamic range image partition converted from the currently decoded relatively low dynamic range image partition and (b) all relatively low dynamic range image partitions in a relatively low dynamic range image preceding to the currently decoded relatively low dynamic range image partition.

20. The method as recited in claim 13, wherein the collected previous image partition statistic information is stored in a sliding window that stores information relating to (a) up to a fixed number of reconstructed relatively high dynamic range image partitions in a reconstructed relatively high dynamic range image most recently preceding to the currently reconstructed relatively high dynamic range image partition converted from the currently decoded relatively low dynamic range image partition and (b) up to the fixed number of relatively low dynamic range image partitions in a relatively low dynamic range image most recently preceding to the currently decoded relatively low dynamic range image partition.

21. The method as recited in claim 13, wherein the currently decoded relatively low dynamic range image partition and the previously decoded relatively low dynamic range image partitions are a part of base-layer (BL) image data in a multi-layer video signal.

22. The method as recited in claim 13, wherein neither the collected previous image partition statistic information nor the one or more prediction parameters for the currently decoded relatively low dynamic range image partition are provided as metadata in a multi-layer video signal that comprises the currently decoded relatively low dynamic range image partition and the previously decoded relatively low dynamic range image partitions are a part of base-layer (BL) image data in the multi-layer video signal.

23. The method as recited in claim 13, wherein the currently decoded relatively low dynamic range image partition comprises pixel values in one or more of a luminance channel, a chroma channel, a red color channel, a blue color channel, a green color channel, or other primary channels.

24. The method as recited in claim 13, wherein the previously decoded relatively low dynamic range image partitions represent one or more of a top neighboring partition, a left neighboring partition, a top-left neighboring partition, or a top-right neighboring partition, in a relatively low dynamic range image with respect to the relatively low dynamic range image partition.

25. A computing device comprising one or more processors and one or more storage media, storing a set of instructions, which when executed by one or more processors cause performance of the method recited in claim 1.

26. One or more non-transitory computer-readable storage media storing a set of instructions, which when executed by one or more processors, cause the one or more processors to perform the method recited in claim 1.

27. A computing device comprising one or more processors and one or more storage media, storing a set of instructions, which when executed by one or more processors cause performance of the method recited in claim 13.

28. One or more non-transitory computer-readable storage media storing a set of instructions, which when executed by one or more processors, cause the one or more processors to perform the method recited in claim 13.

* * * * *